(12) United States Patent
Liu et al.

(10) Patent No.: US 7,720,993 B2
(45) Date of Patent: May 18, 2010

(54) INFORMATION DRIVEN ROUTING IN AD HOC SENSOR NETWORKS

(75) Inventors: Juan Liu, Milpitas, CA (US); Feng Zhao, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1916 days.

(21) Appl. No.: 10/736,748

(22) Filed: Dec. 17, 2003

(65) Prior Publication Data

US 2005/0138200 A1  Jun. 23, 2005

(51) Int. Cl.
G06F 15/173 (2006.01)
G06F 11/00 (2006.01)
G06F 15/18 (2006.01)

(52) U.S. Cl. .................. 709/238; 370/238; 370/395.32; 706/19

(58) Field of Classification Search .................. 709/238
See application file for complete search history.

(56) References Cited

U.S. PATENT DOCUMENTS

| | | | |
|---|---|---|---|
| 5,600,638 A * | 2/1997 | Bertin et al. ................. | 370/351 |
| 5,974,236 A * | 10/1999 | Sherman ...................... | 709/221 |
| 6,078,963 A | 6/2000 | Civanlar et al. | |
| 6,163,799 A * | 12/2000 | Kambayashi et al. ........ | 709/204 |
| 6,219,823 B1 * | 4/2001 | Hama et al. .................... | 716/12 |
| 6,321,271 B1 | 11/2001 | Kodialam et al. | |
| 6,347,078 B1 * | 2/2002 | Narvaez-Guarnieri et al. ........................... | 370/230 |
| 6,363,319 B1 * | 3/2002 | Hsu ........................... | 701/202 |
| 6,421,354 B1 * | 7/2002 | Godlewski ................... | 370/466 |
| 6,498,795 B1 * | 12/2002 | Zhang et al. ................. | 370/400 |
| 6,502,082 B1 * | 12/2002 | Toyama et al. ................ | 706/16 |
| 6,529,498 B1 * | 3/2003 | Cheng ........................ | 370/351 |
| 6,643,699 B1 * | 11/2003 | Liver ........................... | 709/226 |
| 6,658,479 B1 * | 12/2003 | Zaumen et al. .............. | 709/238 |
| 6,801,878 B1 * | 10/2004 | Hintz et al. .................. | 702/188 |
| 6,804,201 B1 * | 10/2004 | Gelenbe ...................... | 370/255 |
| 6,870,846 B2 * | 3/2005 | Cain ........................... | 370/392 |
| 6,963,747 B1 * | 11/2005 | Elliott ......................... | 455/450 |
| 7,020,046 B1 * | 3/2006 | Baylog et al. ............... | 367/124 |

(Continued)

OTHER PUBLICATIONS

S. Edelkamp and J. Eckerle, New Strategies in Learning Real Time Heuristic Search, AAAI Technical Report WS-97-10, 1997, p. 30-35 (Variant of LRTA).*

(Continued)

*Primary Examiner*—Saleh Najjar
*Assistant Examiner*—Robert Shaw
(74) *Attorney, Agent, or Firm*—Oliff & Berridge, PLC

(57) ABSTRACT

A sensor network routing is formulated as a joint optimization problem taking into account routing cost and information aggregation. Information gain is used explicitly to optimize the routing path. The optimization approach involves a shortest path algorithm in a modified network graph. A method is provided that routes queries from an arbitrary entry point to high activity network sensor regions using inputs from sensor nodes along the path to refine the message. The multiple step look-ahead approach provides deadlock avoidance and routing around sensor network holes. For point-to-point query routing, a method based on real-time A* (RTA*) search is provided to find a path which takes detours efficiently to maximize information aggregation. Future information expected to be gained along the path from an arbitrary node to an exit node may be estimated to allow the selection of a successor sensor node.

15 Claims, 17 Drawing Sheets

U.S. PATENT DOCUMENTS

| | | | |
|---|---|---|---|
| 7,020,701 B1* | 3/2006 | Gelvin et al. | 709/224 |
| 7,024,402 B2* | 4/2006 | Morimoto et al. | 707/3 |
| 7,092,715 B2* | 8/2006 | Korpela et al. | 455/446 |
| 7,158,511 B2* | 1/2007 | Payton | 370/389 |
| 2002/0069014 A1* | 6/2002 | Ranjan | 701/202 |
| 2002/0091855 A1* | 7/2002 | Yemini et al. | 709/238 |
| 2002/0131363 A1* | 9/2002 | Beshai et al. | 370/230 |
| 2003/0005149 A1* | 1/2003 | Haas et al. | 709/238 |
| 2003/0014286 A1* | 1/2003 | Cappellini | 705/5 |
| 2003/0043815 A1* | 3/2003 | Tinsley et al. | 370/395.21 |
| 2003/0120817 A1* | 6/2003 | Ott et al. | 709/249 |
| 2003/0156543 A1* | 8/2003 | Sahinoglu et al. | 370/238 |
| 2003/0169719 A1* | 9/2003 | Isobe et al. | 370/338 |
| 2003/0204623 A1* | 10/2003 | Cain | 709/241 |
| 2004/0190476 A1* | 9/2004 | Bansal et al. | 370/338 |
| 2005/0036460 A1* | 2/2005 | Dougherty et al. | 370/328 |

OTHER PUBLICATIONS

D. Blei and L. Kaelbling, Shortest Paths in a Dynamic Uncertain Domain, Proceedings of the IJCAI Workshop on Adaptive Spatial Representation of Dynamic Environments, 1999.*

K. Akkaya & M Younis, A survey on routing protocols for wireless sensor networks, Elsevier Science Direct, Nov. 2003.*

C. Fei and B. Faltings, Intelligent Aganet for Network Management, AI for Network Management Systems, 1997 IEEE Digest No. 97/094.*

N.F. Ayan, "Using Information Gain as Feature Weight", Proceedings of the 8th Turkish Symposium on Artificial Intelligence and Neural Networks (TAINN'99), Istanbul, Turkey, Jun. 1999. http://citeseer.ist.psu.edu/old/278907.html.*

H. Kanoh and T. Nakamura, Knowledge Based Genetic Algorithm for Dynamic Route Selection, Fourth International Conference on Knowledge-Based Intelligent Engineering Systems & Allied Technologies, Aug. 30-Sep. 1, 2000, Brighton,UK.*

D Furcy & S Koenig, Combining Two Fast-Learning Real-Time Search Algorithms Yields Even Faster Learning, Proceedings of ECP-01, Toledo (Spain), Sep. 2001.*

D Furcy & S Koenig, Speeding Up the Convergence of Real Time Search, Proc. of AAAI, 2000, p. 891-897.*

M. Shimbo and T. Ishida, Controlling the learning process of real-time heuristic search doi:10.1016/S0004-3702(03)00012-2.*

T. Ishida and M. Shimbo, Improving the Learning Efficiencies of Realtime Seach, Proc. of AAAI-96 (weighted LRTA).*

A. Stentz, Optimal and Efficient Path Planning for Partially-Known Environments, in Conference Proceedings on Robotics and Automation, vol. 4, IEEE International, May 1994, pp. 3310-3317 ISBN: 0-8186-5330-2.*

Chu et al. Scalable Information-Driven Sensor Querying and Routing for Ad Hoc Heterogeneous Sensor Networks, The International Journal of High Performance Computing Applications, vol. 16, No. 3, Fall 2002.*

Kuhn et al. Asymptotically Optimal Geometric Mobile AdHoc Routing, 6th International Workshop on Discrete Algorithms and Methods for Mobile Computing and Communications (DIALM) Atlanta, Georgia, Sep. 28, 2002 http://eprints.kfupm.edu.sa/26888/1/26888.pdf.*

Geman and Jedynak, An Active Testing Model for Tracking Roads in Satellite Images, IEEE Transactions on Pattern Analysis and Machine Intelligence, vol. 18, No. 1, Jan. 1996, pp. 1-14.*

Intanagonwiwat et al. Directed Diffusion: A Scalable and Robust Communication Paradigm for Sensor Networks, Proceedings of the Sixth Annual Conference on Mobile Computing and Networks (MobiCOM 2000), Boston, 2000Intanagonwiwat et al.*

A. Stentz, Optimal and Efficient Path Planning for Partially-Known Environments, in Conference Proceedings on Robotics and Automation, vol. 4, IEEE International, May 1994, pp. 3310-331 ISBN: 0-8186-5330-2.*

T. Ishida and M. Shimbo, Improving the Learning Efficiencies of Realtime Seach, Proc. of AAAI-96.*

Byers & Nasser, Utility-Based Decision-Making in Wireless Sensor Networks, IEEE 2000, pp. 143-144.*

Savvides et al. Dynamic Fine-Grained Localization in Ad-Hoc Networks of Sensors, ACM SIGMOBILE, Rome, Italy 2001, pp. 166-179 ISBN 1-58113-422-3/01/07.*

Kuhn et al. Asymptotically Optimal Geometric Mobile AdHoc Routing, 6th International Workshop on Discrete Algorithms and Methods for Mobile Computing and Communications (DIALM) AtD. Blei and L. Kaelbling, Shortest Paths in a Dynamic Uncertain Domain, Proceedings of the IJCAI Workshop on Adaptive Spatial Representation of Dynamic Environments, 1999.*

Akkaya & Younis—Survey of routing protocols for sensor networks, AdHoc Networks, Elsevier(Science Direct), pp. 325-349 (Nov. 2003).*

Liu et al.; "Collaborative In-Network Processing for Target Tracking"; EURASIP Journal on Applied Signal Processing; No. 4; Mar. pp. 378-391.

Korf; "Real-Time Heuristic Search"; Artificial Intelligence; vol. 42; 1990; pp. 189-211.

Shah et al.; "Energy Aware Routing for Low Energy Ad Hoc Sensor Networks"; Proceedings of the IEEE Wireless Communications and Networking Conference (WCNC); Mar. 17-21, 2002, Orlando, FL.

Li et al.; "Online Power-aware Routing in Wireless Ad-hoc Networks"; Proceedings of the Seventh Annual International Conference on Mobile Computing and Networking (Mobicom); Jul. 2001; Rome, Italy.

U.S. Appl. No. 60/383,916, filed May 28, 2002, Zhao et al.

U.S. Appl. No. 10/446,115, filed May 28, 2003, Zhao et al.

U.S. Appl. No. 10/736,601, filed Dec. 17, 2003, Liu et al.

U.S. Appl. No. 10/655,301, filed Sep. 5, 2003, Reich et al.

* cited by examiner

INFORMATION DRIVEN ROUTING IN AD HOC SENSOR NETWORKS

STATEMENT OF GOVERNMENT FUNDING

The work described in this application was supported by funding from the Defense Advanced Research Projects Agency under DARPA contract number F30602-00-C-0139. The government may have certain rights to this invention.

BACKGROUND OF THE INVENTION

1. Field of Invention

The systems and methods of the invention concern information directed routing in ad hoc sensor networks.

2. Description of Related Art

Routing in traditional communications networks is a well-studied problem in both patent and non-patent literature. Graph-based algorithms such as Dijkstra's or Bellman-Ford type algorithms are often used to determine optimal paths within a network with respect to metrics such as, for example, communication cost and delay. Of recent interest is the topic of routing with resource constraints. Energy aware network routing has been proposed in various places, such as, Shah et al., Proceedings of the IEEE Wireless Communications and Networking Conference (WCNC), Mar. 17-21, 2002, Orlando, Fla.; and Aslam et al., Proceedings of the Seventh Annual International Conference on Mobile Computing and Networking (Mobicom), July 2001, Rome, Italy. More complicated constraints are incorporated into routing problems in U.S. Provisional Patent Application Ser. No. 60/373,916, entitled, "Systems and methods for constrained anisotropic diffusion routing with an ad hoc network," by Haussecker, et al., and co-pending U.S. non-provisional patent application Ser. No. 10/446,115, the disclosures of which are hereby incorporated by reference in their entirety. In Haussecker et al., the route destination is specified by a set of constraints, and the disclosed algorithm seeks efficient routes to the destination.

Constrained anisotropic diffusion routing (CADR) is proposed in the target tracking applications of Haussecker et al. to route a query from a peripheral access point to high activity regions, using information gained enroute to guide the successor node selection. The information gained enroute is measured using variations of distance metric, assuming the sensors that are close by the target have more information about the target than those that are far away from the target. The optimization problem is greedy, that is, at each step, the current leader selects among its successors the best choice for the time being and hands over leadership to the best choice. Due to its greedy nature, the selection is sub-optimal and often gets stuck at sensor holes where the sensor field is sparse.

Network route selection for fixed centralized computer networks is described in a number of publications, including, for example, U.S. Pat. No. 6,321,271, which describes a method for finding the short routing path under some acceptable delay constraints. The method described by this patent employs a two stage process, using Dijkstra's algorithm at each phase. The algorithm is designed for wired high speed data communication networks, is centralized in nature, and requires complete knowledge of network topology in some central unit.

U.S. Pat. No. 6,078,963 describes a distributive router system. The focus of the disclosure of this patent is on the infra-structure. The router mechanism described by this patent is determined prior to the system setup.

U.S. Pat. No. 6,363,319 describes a method and apparatus for selecting a route for a flow from a plurality of network paths connecting a source to a destination. The accumulative cost is determined dynamically based on network characterizations such as flow attributes such as, for example, priority, bandwidth demand, etc., and path attributes, such as for example, available bandwidth.

U.S. Pat. No. 6,421,354 describes a system for providing data acquisition services for a customer from a sensor located in a remote location. The focus of the disclosure of the patent is on infra-structure.

U.S. Provisional Patent Application Ser. No. 60/373,916, discussed above, describes a method that uses information gained in a greedy algorithm to select the next sensor.

SUMMARY OF THE INVENTION

An ad hoc sensor network is an emerging area in which technologies in traditional fields such as sensing, signal processing, estimation, and networking are integrated together. In many ad hoc sensor networks, sensor nodes can be considered as units with multiple functionalities such as sensing, data processing, information fusion, and network routing. To track or monitor some event of interest, these functionalities need to be properly combined. In principle, a routing problem in a sensor network is often coupled with information aggregation. For example, if a message containing information about the event of interest is to be transferred from one sensor node to another, one would like to not only find the path that is efficient in terms of communication cost, for example, measured using a metric such as the number of transfers (hops), the energy needed to transmit the information, etc., but also to aggregate as much information as possible along the path, so that the user can have a good estimate/description about the event of interest at a destination node. In this sense, routing is not only a message-transporting mechanism, but also contributes to the successive refinement of the message.

Various exemplary embodiments of the systems and methods according to this invention introduce the idea of information directed routing and sensor networks. Information aggregation is taken into account explicitly. Routing becomes a joint optimization problem whose solution results from the trade-off between two terms, that is, the routing cost that is incurred, and the information that can be gained by taking the path. This is in sharp contrast to the communication routing problem, where only the routing cost is of interest.

According to the various exemplary embodiments of the systems and methods of this invention, the optimization based on information gained is intrinsically more complicated than typical network route selection problems, where only the shortest paths from the access node to the destination node are of interest. Various exemplary embodiments of the systems and methods according to this invention address problems such as how to measure the information gained at the sensor node, how to estimate the information gained that traversing through a path may bring, and how to find the optimal path.

Various embodiments of the systems and methods according to this invention formulate the sensor network routing problem as a joint optimization problem taking into account routing cost and information aggregation. Information gain is used explicitly to optimize the routing path. With this joint optimization approach, the selected path is efficient in terms of communication metric, and also aggregates information about the event of interest. The optimization formulation breaks the barrier between network layer routing and application layer information aggregation/processing.

According to the various embodiments of the systems and methods of this invention, for the case of stationary node states and additive information cost, the optimal optimization problem is reduced to the shortest path algorithm in a modified network graph.

Various exemplary embodiments of the systems and methods according to this invention route queries from an arbitrary entry point to high activity regions, e.g., regions in the vicinity of an event of interest, such as, for example, the location of a target, using inputs from sensor nodes along the path to refine the message. This can be considered as an extension of constrained anisotropic distribution routing (CADR) in terms of routing, and an extension of information-driven sensor querying (IDSQ) in terms of estimation. The multiple-step look-ahead approach of the various embodiments of the systems and methods according to this invention give better performance than the greedy CADR or IDSQ methods. With sufficient look-ahead horizon, the systems and methods according to this invention may avoid deadlocks and route around network sensor coverage holes.

Various exemplary embodiments of the systems and methods according to this invention route queries between an arbitrary entry point and extraction point using an RTA*-type forward search algorithm. Various exemplary embodiments of the systems and methods according to this invention also estimate the future information gained along the path and select a successor node based on the estimate.

BRIEF DESCRIPTION OF THE DRAWINGS

Various exemplary embodiments of this invention will be described in detail with reference to the following figures, wherein.

DETAILED DESCRIPTION OF EXEMPLARY EMBODIMENTS

Figure 1:
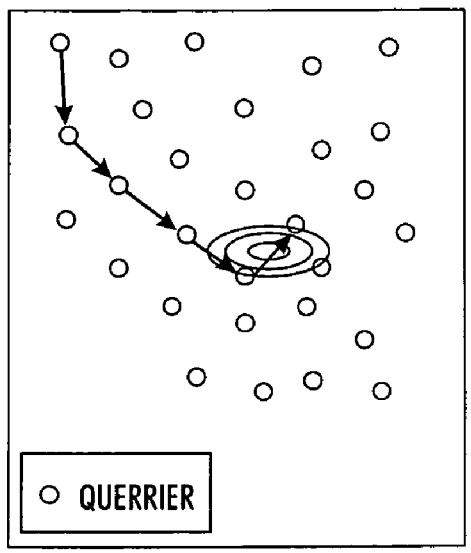
FIG. 1 is an exemplary embodiment of a route query to high activity network regions according to the systems and methods of the invention.

The invention describes a method to formulate the routing problem in ad hoc sensor networks, namely information-directed routing, which selects path which is both efficient in terms of communication cost but aggregates substantially information about the phenomenon of interest. One exemplary embodiment that involves a target estimation problem is tracking a target in a physical location domain, such as a two dimensional plane. Under the circumstances of this exemplary embodiment, it would be useful to transport a message and at the same time refine the target location estimate. This problem may be formulated as seeking a path in a network graph G=(V, E), where V are the collection of vertices, essentially the sensor nodes, and E are the edges, representing the connectivity in the network. The result path, denoted as $(v_1, v_2, \ldots, v_T)$, where $v_1, v_2, \ldots, v_T$ are the vertices visited by the path in order, should be optimal in minimizing the total cost The total cost may be expressed by the following equation 1:

$$E = \sum_{i=1,\ldots,T-1} c_{i,i+1} - \gamma g(v_1, v_2, \ldots, v_T) \quad (1)$$

The first term of Equation 1 is the summation of the costs $\{c_{i,i+1}\}$ associated with each individual edge of the aforementioned network sensor grid, measuring the communication expense of going from node i to node i+1. This cost is often expressed in terms of communication energy or delay.

The second term in Equation 1 is the negative information gain $-g(v_1, v_2, \ldots, v_T)$. This can be measured using metrics such as:

Variations of Euclidean distance. This metric is used for example in the incorporated Haussecker provisional application, and is normally considered to achieve good results if the sensor network is homogenous and consists of sensors whose quality of measurements decays monotonically with distance.

Mutual information. This statistics-based metric is used in an article by Liu et al., entitled "Collaborative in-network processing for target tracking," which appeared in EURASIP Journal on Applied Signal Processing, pp. 378-391, No. 4, March 2003

Norm of inverse covariance matrix. This is discussed in Durrant-Whyte et al., "Data fusion and sensor management: a decentralized information-theoretic approach," Prentice Hall, London, UK, 1993. This metric is easy to calculate, and can be regarded as a special case of the mutual information metric under the assumption that the sensor observational model and the target state dynamics are linear Gaussian.

The regularization parameter γ in Equation 1, controls the balance between the two terms. In traditional communication network applications where shortest path is of interest, γ is zero. In applications where the information gain is the primary concern, and high communication cost is affordable, γ should be set some high value, for example, a multiple of (e.g., 100 times) the ratio between the communication cost term and the information gain term $g(v_1, v_2, \ldots, v_T)$. With such relatively large value, the communication cost is negligible compared to the information gain term, hence the optimization strongly favors the maximal information gain solution.

If, furthermore, the information gain is additive, that is, $$g(v_1, v_2, \ldots, v_T) = g(v_1) + g(v_2) + \ldots + g(v_T) \quad (2)$$

(as is the case if the inverse covariance matrix norm is used as the information gain metric), it is straight-forward to show that the total cost E is additive. Under the assumption set forth in Equation 2, the optimization of finding the best path from some initial leader node to any other nodes can be converted to the equivalent problem of finding the shortest path in a new graph G', which has the same set of vertices (nodes) and edges. The edge costs in G' are those in the original graph G modified by the information gain along each edge. In principle, simple Dijkstra's or Bellman-Ford type algorithms can be used to find such optimal paths.

In practical sensor network systems, the information gain is often non-additive, and the problem of finding an optimal path is more complicated. In particular, the information gain is often dependent on the belief of the event of interest, and therefore, is history dependent. The cost of each edge is not a static value, but depends on the previously visited nodes. For such history dependent problems, standard shortest path algorithms are not applicable. Instead, the problem is combinatorial in nature. The possible sequences of visiting nodes may be enumerated and the best sequence may be selected. This approach is computationally formidable when the sensor network is large. Exemplary embodiments of the systems and methods according to this invention provide efficient suboptimal methods for path selection for some important scenarios in sensor network applications.

FIG. 1 depicts a network with sensors, shown as dots with surrounding circles, and a querier node, shown as the darkly shaded circle, and illustrates an exemplary embodiment of a route query to relatively high activity network sensor regions and describes a scenario where the goal of routing is to route a query from an arbitrary querier node to the vicinity of a high activity region, such as, for example, the location of an event of interest like a target, and describes a method (min-hop algorithm) to find an information-directed path to fulfill this routing goal.

In target tracking applications, it is often important to be able to initiate a query from some arbitrary entry point to find out the current status of the target. Ideally, the entry point node would like to contact the nodes in a high activity region, which presumably have a good estimate about the event of interest, such as target location. Due to the distributed nature of an ad hoc sensor network, the entry point may not be aware of the high activity region. Therefore, it is necessary for the entry point node to figure out which node in its local neighborhood may have better information, and then relay the query to that node. During the relay, the intermediate nodes can incorporate their measurements to refine the target estimated, and in return, the refined estimate further improves the relay. This problem may be considered as a dual of the sensor selection problem in target tracking. The current leader node needs to decide which nodes among its neighborhood have the measurement which could help the most in terms of refining the target location estimate.

In the exemplary embodiments, a computationally efficient algorithm, which is designated as a "min-hop" algorithm is used to solve the aforementioned query routing problem. The algorithm first selects the destination node by computing the utility of all the nodes it is aware of and selecting the node with the highest individual utility as the destination node. The letter m is used to designate the minimum number of hops required in order to reach the destination from a current leader. The algorithm then considers all possible paths of m hops or less from the source, which is the current leader node, to the destination node, and selects the path that traverses nodes with the greatest sum of information utility. This implies that the communication cost of each link in the graph, for example, measured by hop counts, is equal. The leader node then selects the first node in this path and passes the leadership to it. This algorithm may be performed at each time step and can be expressed as follows:

1) Identify node with highest utility (i.e., information gain).

2) Consider all the min-hop paths to that node.

3) Select the path among min-hop paths that provides greatest total utility.

Conveniently, various exemplary embodiments of the systems and methods according to this invention provide a shortcut for finding the minimum hop path to a destination node that maximizes the utility acquired along the path. The method is based on the observation that if a very large positive value is added to the cost of every link in the graph, then running a shortest path algorithm, such as Dijkstra's algorithm or the Bellman-Ford algorithm, will result in discovering the best among the minimum hop paths from the source node to each destination node. For a discussion of Dijkstra's shortest path algorithm, refer to A. S. Tanenbaum, Computer Networks, 3.sup.rd ed. Prentice-Hall, Inc., (1996), sec. 5.2.2. The Bellman-Ford algorithm is a shortest path on a weighted graph algorithm taught by D. P. Bertsekas in Dynamic Programming: Deterministic and Stochastic Models, pages 318-322, Prentice-Hall, 1987, Englewood Cliffs, N.J., and D. P. Bertsekas and R. Gallager in Data Networks, pages 315-332, Prentice-Hall, 1987, Englewood Cliffs, N.J.

The asymptotic computational complexity of the "min-hop" algorithm is the same as the complexity of the shortest path algorithm used in time step three, described above. When Dijkstra's algorithm is used, that complexity is O(N log N+E) where N is the total number of nodes in the graph.

The m-step look-ahead is often useful when the sensor network has some inhomogeneity, such as the presence of sensor holes. Incapable of seeking further beyond the immediate neighborhood, greedy algorithms such as CADR or IDSQ often get stuck at sensor holes because the best choice for the time being may be a dead end in the sensor holes. The m-step look-ahead scheme allow the min-hop algorithm to plan around the sensor holes, and, as a result, the exemplary embodiments of the systems and methods of this invention which utilize the min-hop algorithm outperform CADR and IDSQ significantly in terms of routing cost and estimation performance.

Figure 4:
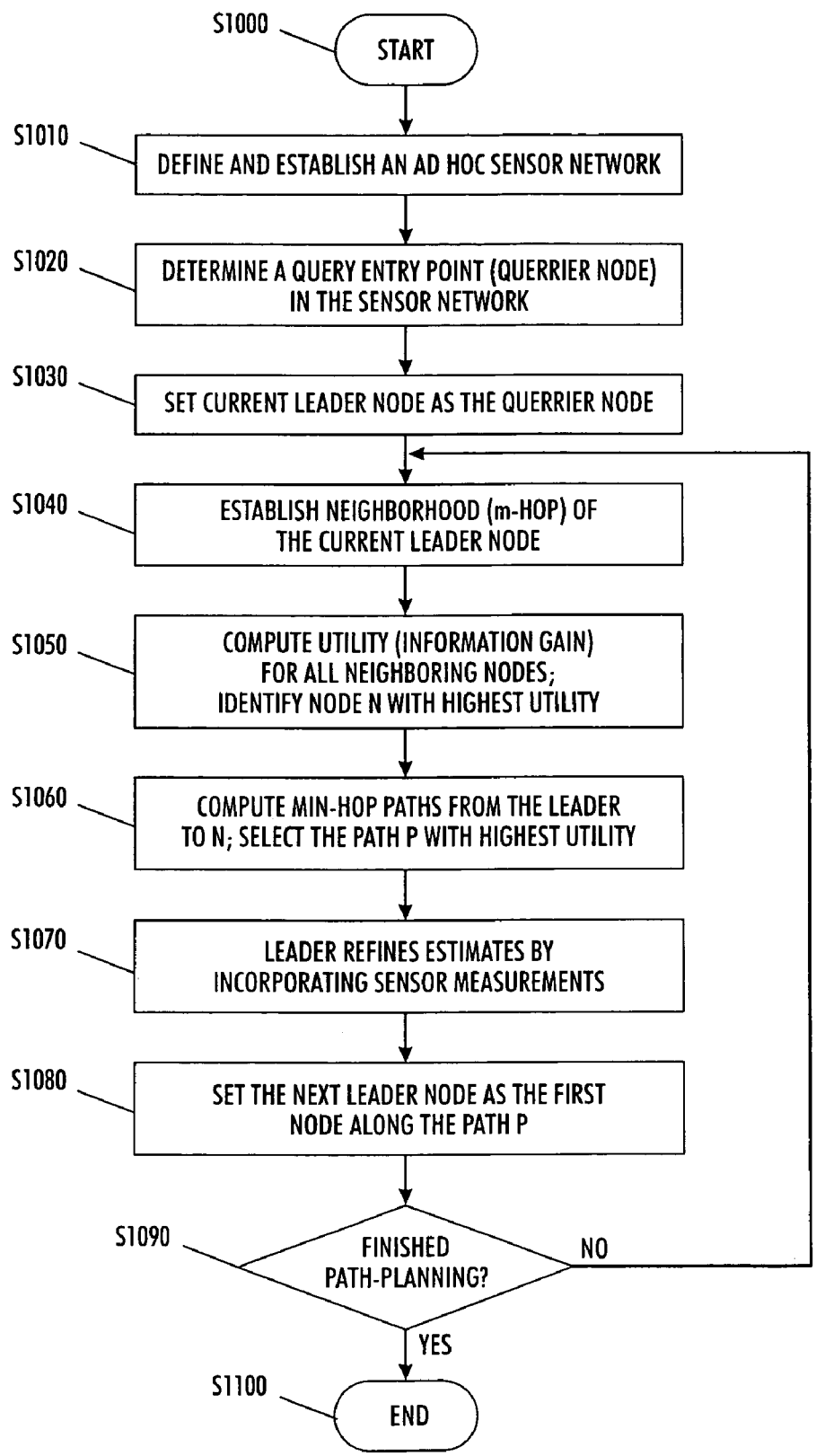
FIG. 4 is a flowchart outlining an exemplary embodiment of information routing, according to this invention, to route a query from an arbitrary querier node to high-activity region to collect information.

FIG. 4 shows a flowchart which outlines an exemplary embodiment of a method according to this invention, for example, as discussed above. In step S1000 the process begins. Control then moves to step S1010, where an ad hoc sensor network is defined and established.

Control then moves to step S1020, where a query entry point in the sensor network is determined/selected. Control then proceeds to step S1030, where the min-hop algorithm starts by selecting the querier node as the leader node.

Control then proceeds to step S1040, where a neighborhood around the current leader sensor is established. The neighborhood contains all nodes within m-hops of the current leader. Control then proceeds to step S1050, where the utility (information gain) is evaluated for each node in the neighborhood. The node with highest utility value is identified as the destination point (we denote as N). Control then proceeds to S1060, where the min-hop (shortest) paths from the leader to the destination N are computed. Such path may not be unique. If the min-hop paths are non-unique, the path with maximum utility/information gain is selected. We denote the path as P.

Control then proceeds to step S1070, where the leader refines the target estimates by incorporating sensor measurements. Control then moves to step S1080, where the next leader is selected as the first node along the selected path P. Steps S1040 to S1080 complete a path-planning iteration, and the query is relayed closer to the high-activity region.

Control then proceeds to S1090, where a determination is made so as to whether the path-planning has finished (according to a certain criterion, such as is the information good enough, or is the path exceeding some pre-set length). If so, control proceeds to S1100, where the process ends. Otherwise, control returns to step S1040, and the query relay continues.

Figure 2:
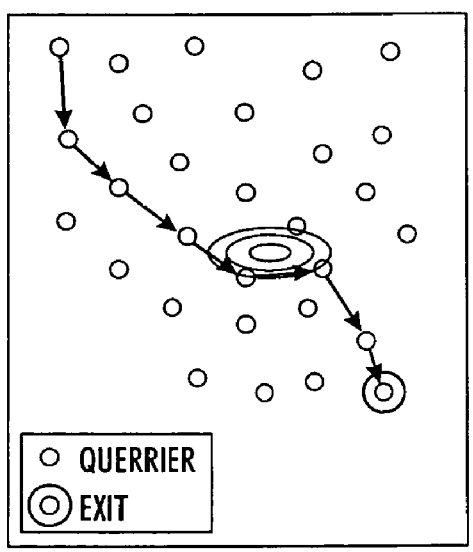
FIG. 2 is an exemplary embodiment of point-to-point routing using forward search according to the systems and methods of this invention.

FIG. 2 illustrates one exemplary embodiment of a point-to-point routing from a querier (entry) node to a destination (exit) node, where the darkened circle is the querier node, the lightly shaded circles represent network sensor nodes, and the darkened circle with the larger circle around it is the exit node. This exemplary embodiment of the systems and methods of the invention describes a scenario where the goal of routing is to route a query from an arbitrary querier node to an arbitrary exit node (point-to-point routing), and proposed a method (RTA* forward search) to fulfill this routing goal.

In this exemplary embodiment according to the principles of this invention, in the situation where a user issues a query from an entry point and wishes to extract the information from another point, called the exit point, in the sensor network, the goal of the user is to route the packet from the query node to the exit node within some specified amount of time and accumulate as much information about the target's position along the way in order to have the best possible estimate of the target position available at the exit node. This exemplary routing scenario embodiment may arise, for example, if a user, for example a police officer, located at an entry point (sensor node), issues a query, asking the sensor network to collect information and report to an exit point (sensor node) located, for example, at a police station, where communicated information can be extracted and utilized.

In this specific exemplary embodiment, an A* type of forward search algorithm is suitable. A* is a best-first search, where the merit of a sensor node is assessed as the sum of the actual cost g paid to reach from the query node and the estimated cost h to pay to get to the exit node (often referred to as the "cost-to-go"). A* search keeps a moving frontier of g+h and iteratively expands the nodes on the frontier until the exit node is reached. A* search is described in detail, for example, in "Real-time Heuristic Search", by R. Korf, which appeared in Artificial Intelligence, vol. 42, pp. 189-211, 1990, the subject matter of which is hereby incorporated herein by reference.

For real time implementation, one may use a real-time A* (RTA*) algorithm. Given a start state (node) and a goal state (exit node), the RTA* algorithm computes the cost of reaching states that can be reached within M steps from the start state, and then uses a heuristic to estimate the remaining cost of reaching the goal state from each of those states. The method used according to this exemplary embodiment attempts to maximize the utility accumulated from visiting all the nodes along the path from the query node to the exit node subject to the constraints that the path can be traversed within some specified amount of path length.

Figure 3:
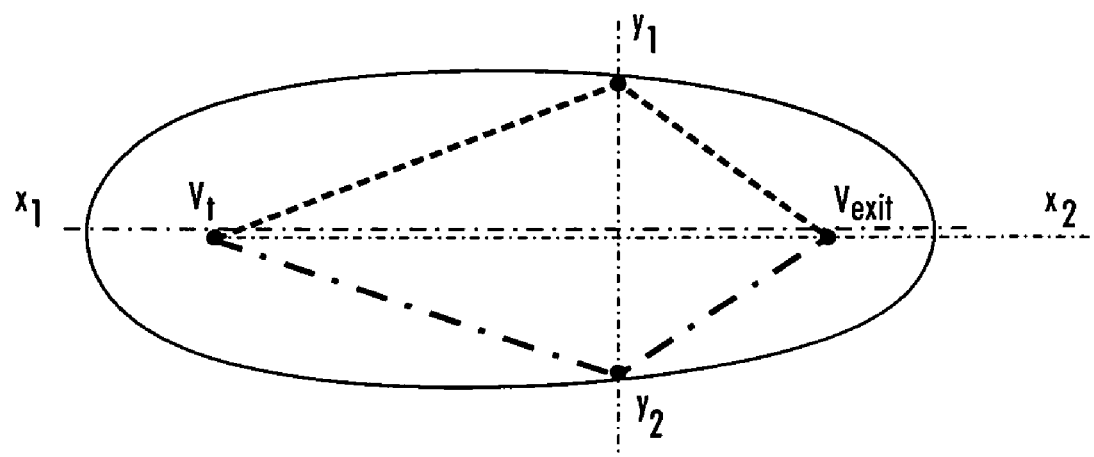
FIG. 3 is a diagram of an exemplary heuristic used to estimate the information expected to be gained on the path from the current node to the exit node according to the systems and methods of the invention.

According to the various exemplary embodiments of the systems and methods of this invention, one way to implement the RTA* algorithm is to define a heuristic to estimate the cost of reaching the goal state from any given state, based on the relative positions of the start state and the goal state. In this case, the cost is the utility involved. In the exemplary embodiment considered here, the delay constraint imposes a limit on the length of a path that may be taken. Thus, the locus of all the possible paths forms an ellipse with the exit node as one focus point and the current node as the other. The utility that one may acquire on the path from a current node to the exit node is estimated to be equal to the utility of the corresponding ellipse. FIG. 3 shows such an ellipse. There are infinitely many paths through the ellipse which satisfy the length constraint, and the path may be very complicated and hard to describe, such as the thin black line from the querier to the exit point in FIG. 3.

Finding the optimal path and assigning its utility as the utility of the ellipse is difficult. The systems and methods according to this invention in one exemplary embodiment use an approximation approach. Using this approach, the ellipse is sampled with four candidate points is shown in FIG. 3, and the maximum utility among those four paths is used as the estimate of the utility of the ellipse. The four paths chosen are the ones consisting of two line segments, starting from the querier node, ending at the exit node, going through one of the four extreme points of the ellipse's minor axis or the major axis. To estimate the utility of a line segment, the systems and methods according to this invention in this exemplary embodiment assume that there are sensor nodes placed at a distance of A from each other along the line segment. The utility of the segment is estimated to be the sum of the utilities of those hypothetical nodes along the line.

The estimation of communication cost from the current node to the exit node is straight forward. One can use a standard metric such as Euclidean distance. This also corresponds to the number of hops when the sensor network is dense. Given the estimate of the communication cost and the estimate of information gained, the RTA* algorithm is straight forward. At step t, the active node grows the tree to a fixed finite depth and computes the sum of the already-encountered cost and the estimated cost to follow. The node with the lowest sum wins. The algorithm then repeats its self until reaching the exit node.

The estimation of information contribution is summarized in Table 1 and some parameters set forth in Table 1 are shown in FIG. 3. In FIG. 3, Node $v_{exit}$ is the exit sensor node.

If the remaining path length allowance $C_t-C_P^{(t)}$ is smaller that the Euclidian distance between $v_t$ to $v_{exit}$, the ellipse cannot be constructed. In such a situation, the estimation algorithm set forth in Table 1 returns no (i.e., zero) information. At this point, the forward search degenerates into a shortest-path problem based on the communication cost alone. Moreover, if the initial allowance $C_0$ is zero to start with, then the algorithm returns the shortest path from the querier to the exit.

An implementation of this algorithm has been achieved and its performance has been compared to a shortest-path algorithm which only considers the communication cost. Allowing the total length to be within twice the length of the shortest path, the estimation accuracy is improved greatly. The mean-squared error (MSE) decreased by a factor of 5 to 7.

The min-hop and the forward-search algorithm require each node to be aware of its local neighborhood, and do not require any node to have complete knowledge about the network. Hence, the algorithm can be distributed and is scalable to large networks.

Figure 5:
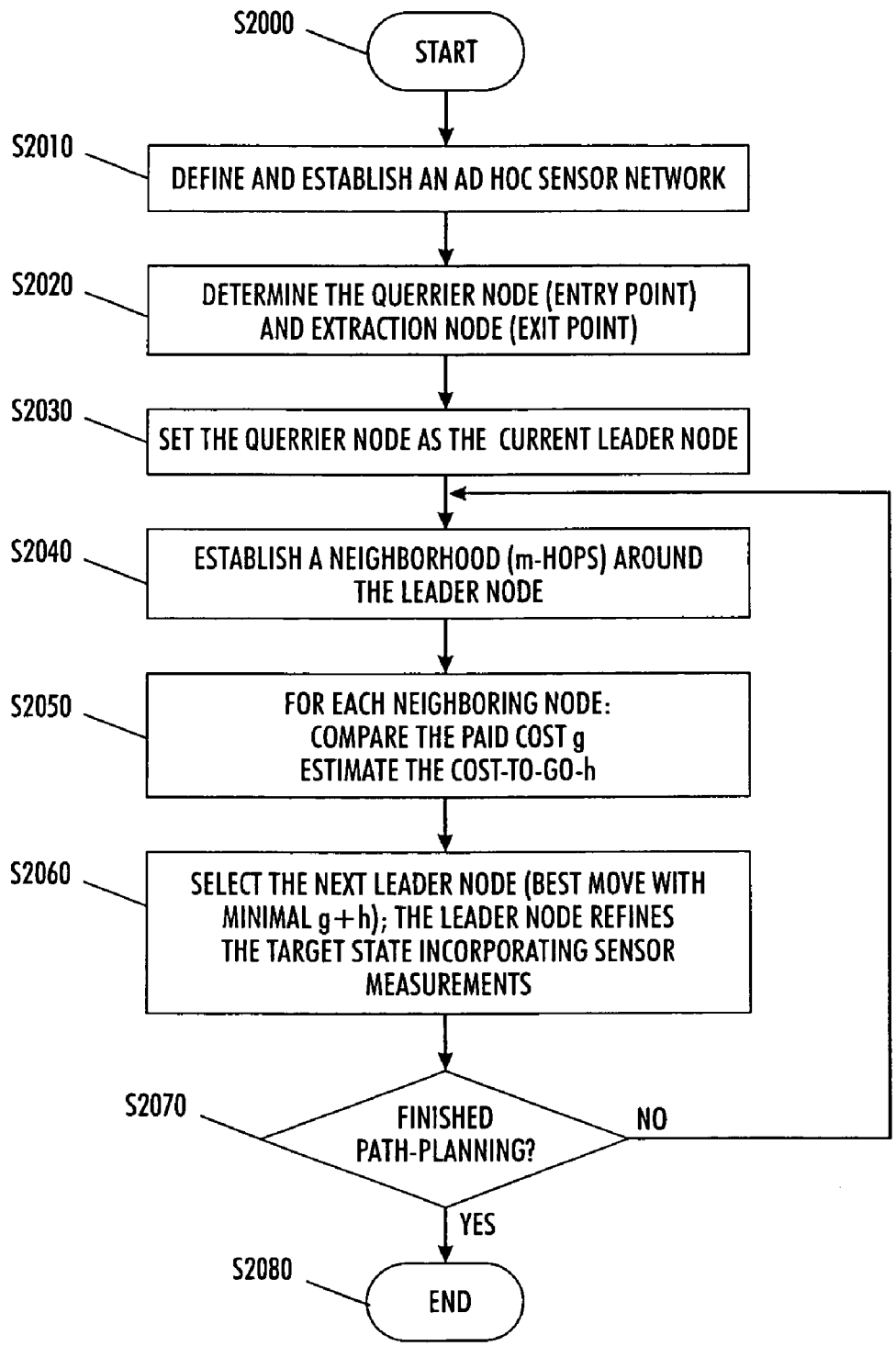
FIG. 5 is a flowchart outlining a point-to-point routing using a forward search according to an exemplary embodiment of the systems and methods of this invention.

FIG. 5 shows a flowchart which outlines the point-to-point routing using a forward search according to the various exemplary embodiments of the systems and methods of this invention, as set forth above. Control starts in step S2000, and proceeds to step S2010, where the ad hoc sensor network is defined. Control then moves to step S2020, where the querier node and the extraction node are designated. They can be any arbitrary node in the sensor network.

Control then proceeds to S2030, where the forward search starts by selecting the querier node as the first leader node. Control then proceeds to step S2040, where a neighborhood around the current leader node is established. It contains sensor nodes within m-hops to the leader. Control then proceeds to step S2050, where the costs for forward search are evaluated. For each neighboring node, an already paid cost g and a cost-to-go h are calculated. They both involve communication expense and information gain.

In this regard, cost-to-go h may be determined as discussed above. Control then proceeds to step S2060, where the neighboring nodes are compared of their overall merit g+h. The node with the smallest g+h value is considered as the best move and selected as the leader for the next time step. The leader then refines target estimates by incorporating sensor measurements. Steps S2040 to S2060 complete an iteration, where the forward search advances by length 1.

Control then moves to S2070, where the test as to whether the path-planning is finished is performed. The path-planning is finished if the extraction node is reached. If so, the system terminates. Otherwise, control returns to S2040, and forward search continues.

In the aforementioned exemplary embodiments of the systems and methods of this invention, the problem discussed is in a target localization framework. The idea of information directed routing is a rather general idea, and the formulation of the systems and methods according to the invention is in terms of information gained, which applies to many applications. For example, in target tracking embodiments, the applicable applications include 1) detection where the target state is discrete, i.e., "zero" when the target is not present and "one" if the target is present); 2) localization, where the target state is the target location; and 3) classification, where the target state is the target type, such as, for example a tank, a car, an airplane, etc.

Simulations were carried out to validate and characterize the performance of exemplary embodiments of the systems and methods of this invention. A simulation of a sensor field with dimensions of 225×375 square meters was made. This simulation involved two types of sensors for target tracking: acoustic amplitude sensors and direction-of-arrival (DOA) sensors. As pointed out above, other types of sensors could have been used. The output sound amplitude of the amplitude sensors was measured at each microphone, and an estimate was made of the distance to a target based on the physics of sound attenuation. The direction of arrival sensors were relatively small microphone arrays. Using conventional beam forming techniques, the direction where the sound comes from, that is the bearing of the target, was determined.

Figure 6:
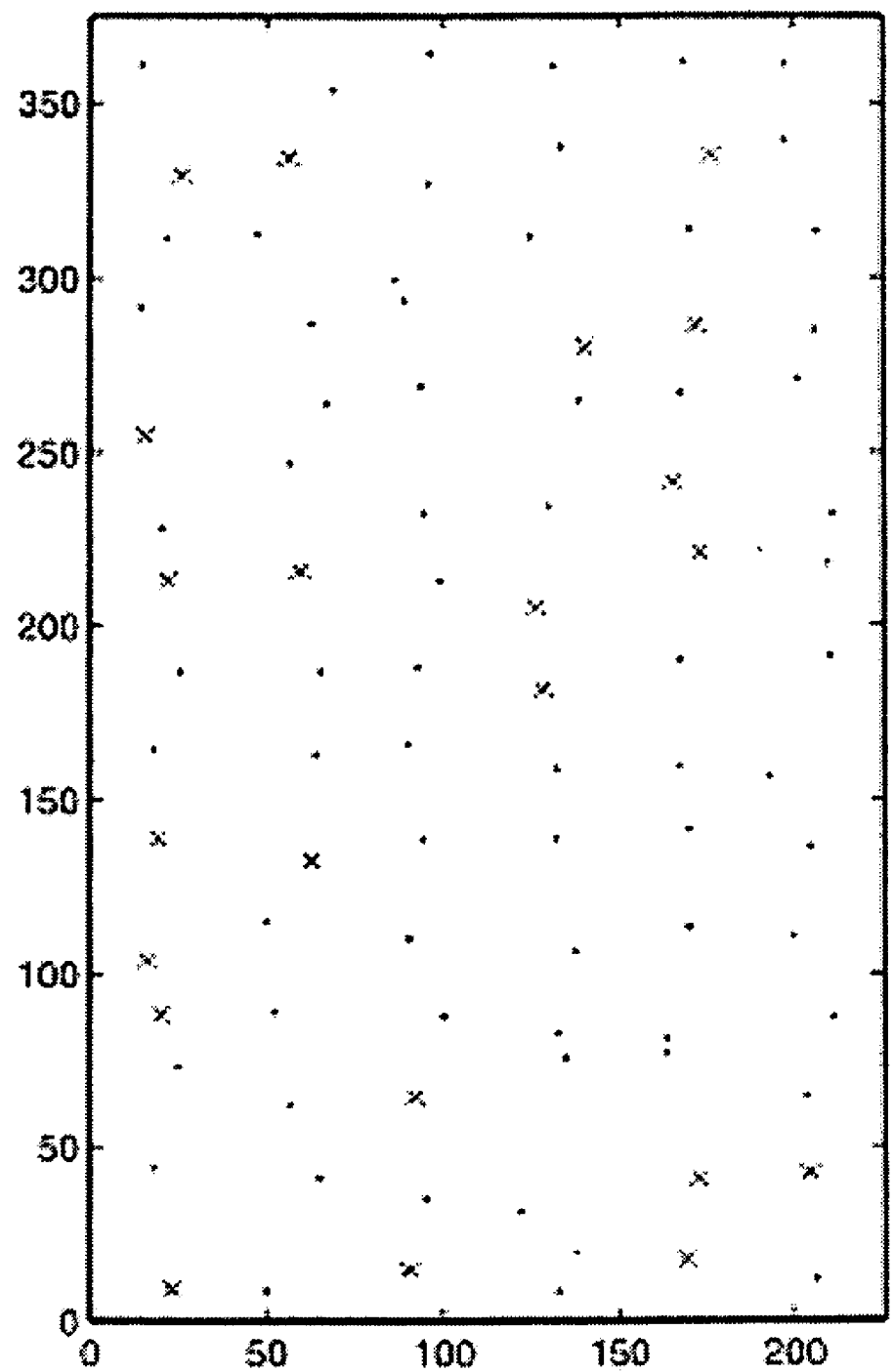
FIG. 6 is a pictorial representation of a substantially homogeneous simulated sensor layout.
Figure 7:
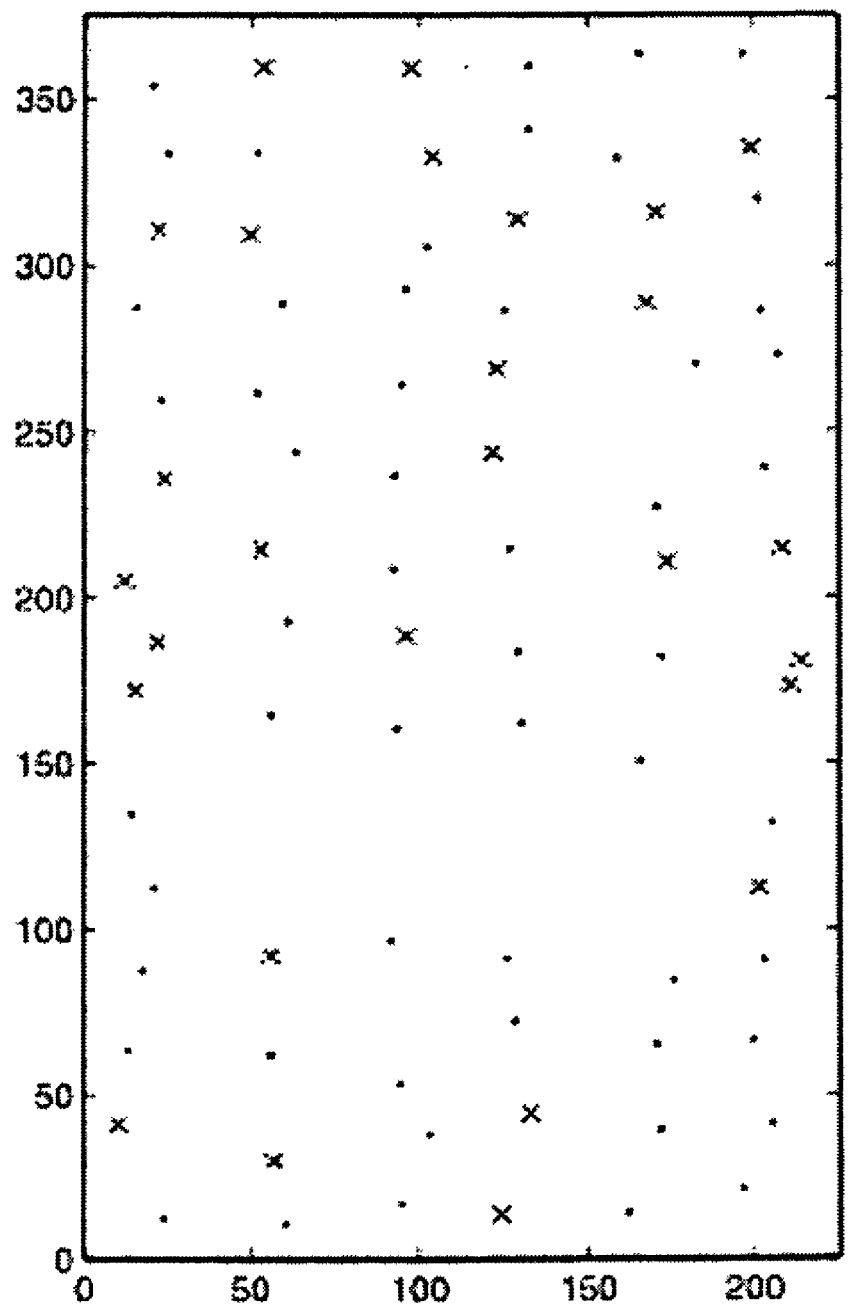
FIG. 7 is a pictorial representation of a simulated sensor layout with a sensor hole.

The sensor network layout was generated in the following manner. First, a uniform grid of 15 rows and 6 columns was generated to evenly cover the region. Then, the grid points were perturbed with independent Gaussian noise of N (0, 25). The resulting sensor layout is shown in FIG. 6. To test the routing performance in the presence of sensor holes, the uniform grid points (sensor nodes) in rows 5 and 6 in columns 2-5 were removed before adding perturbation. The resulting sensor network is shown in FIG. 7. The sensor network consists of approximately 70 percent amplitude sensors which are spread over the sensor region. Each sensor was able to directly communicate to neighbors within about a 50 meter radius.

The routing processes or algorithms were evaluated in terms of the efficiency of communication expenditure, and the effectiveness of information aggregation in support of target tracking. Tracking performance was measured using mean square error (MSE) and belief size. Attention was also paid to noticeable features, such as, for example, whether the path from insertion point to extraction point successfully gets around holes, where the path ends, and how the path detours to accumulate information.

The simulation results for routing a query from an arbitrary query proxy node to an extraction node in a relatively high information content region using an min-hop algorithm is as follows:

In the case of a stationary target, the stationary target is simulated at location (125, 200). The sensor closest to the lower left corner (0, 0) was used as the query proxy node. Starting from the proxy node, the target location was progressively estimated and the query directed towards it. In the simulation, a path length of 20 hops was permitted, and the performance was examined at the end of the path. The sensor network was inhomogeneous with a sensor hole, as shown in FIG. 7.

For this routing task, the min-hop algorithm was compared using a look ahead horizon M=2, 3 and 4 with the greedy CADR algorithm. Each method was simulated with 100 independent runs. The results of those 100 runs are summarized in Table 2. Some paths got stuck and failed to route around the sensor hole. Paths having an ending point with a Y coordinate below 100, were considered as "stuck" situations.

Compared to the greedy CADR algorithm, the min-hop algorithm significantly improved the tracking performance. For example, with a three step look ahead, the min-hop algorithm successfully routed around the sensor hole in 92 runs, whereas only 8 runs become stuck at the sensor hole. By contrast, the CADR algorithm failed in 80 runs. Tracking performance was also improved with the min-hop algorithm. For example, with M=3, the min-hop algorithm reduced the square root of MSE by a factor of four, and reduced the belief size by a factor of three. The tracking performance comparison suggests that the min-hop algorithm aggregates information more effectively than the greedy CADR algorithm.

Table 2 lists the average distance between the path ending point and the true target. This distance indicates the capability of the routing algorithm to route a path to the vicinity of the target. The greedy CADR algorithm performed poorly here. For example, the ending point was, on the average, very far, for example, 108.91 meters, from the true target location. The min-hop algorithm routed the path to much closer positions. For example, with M=3, the ending point was approximately 33 meters from the target.

In general, overall performance is seen to improve with an increase of the look ahead horizon M, but the improvement is non-uniform. The improvement is most prominent for small values of M, and is marginal as M increases. In view of these observations, one may select a value of M based on knowledge of network inhomogeneity, such as for example, sensor hole size. In our simulated sensor layout, a three hop path is often sufficient to get to the side of a sensor hole and further diverge around it. Further increasing M to four appears to bring little gain and performance.

Figure 8:
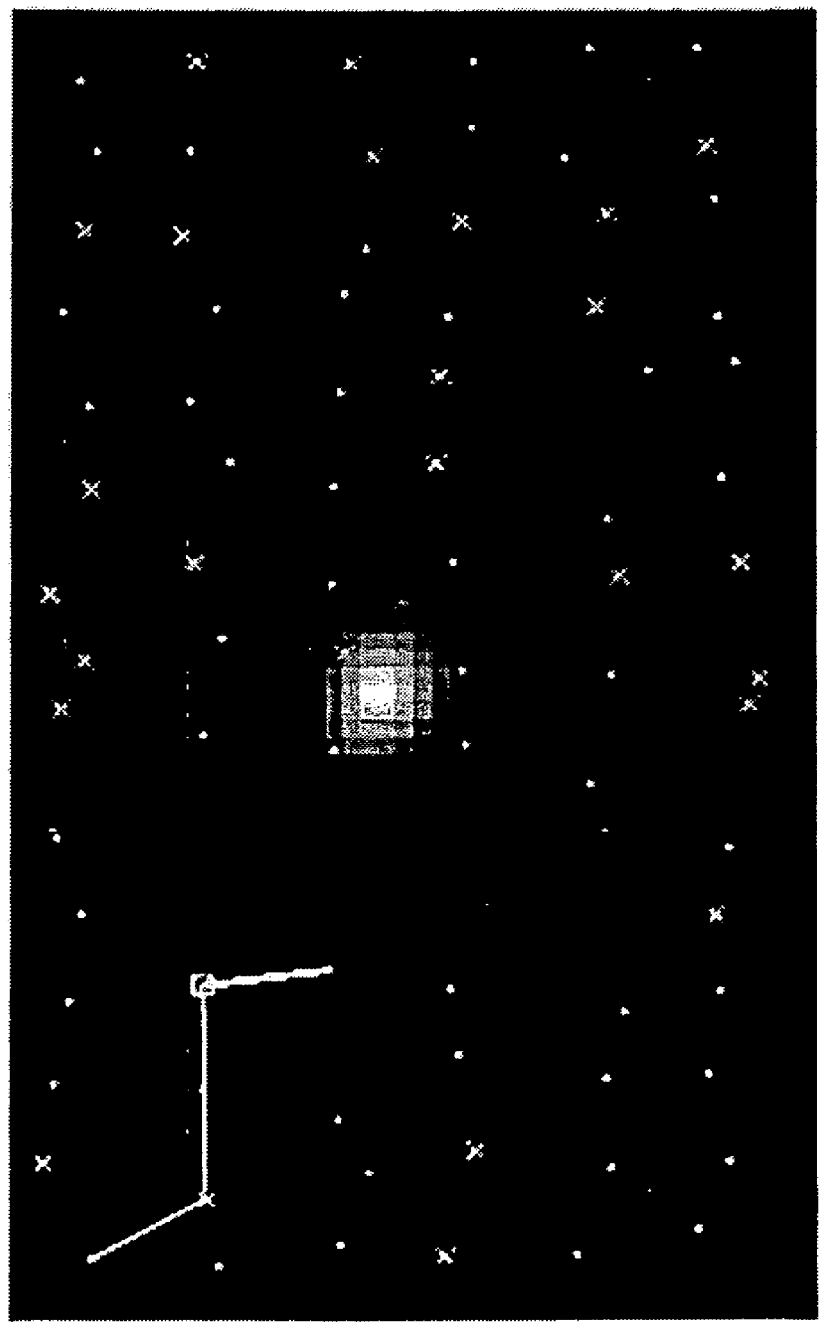
FIG. 8 is a pictorial representation of a simulated sensor layout having a query routing path produced by a greedy algorithm.
Figure 9:
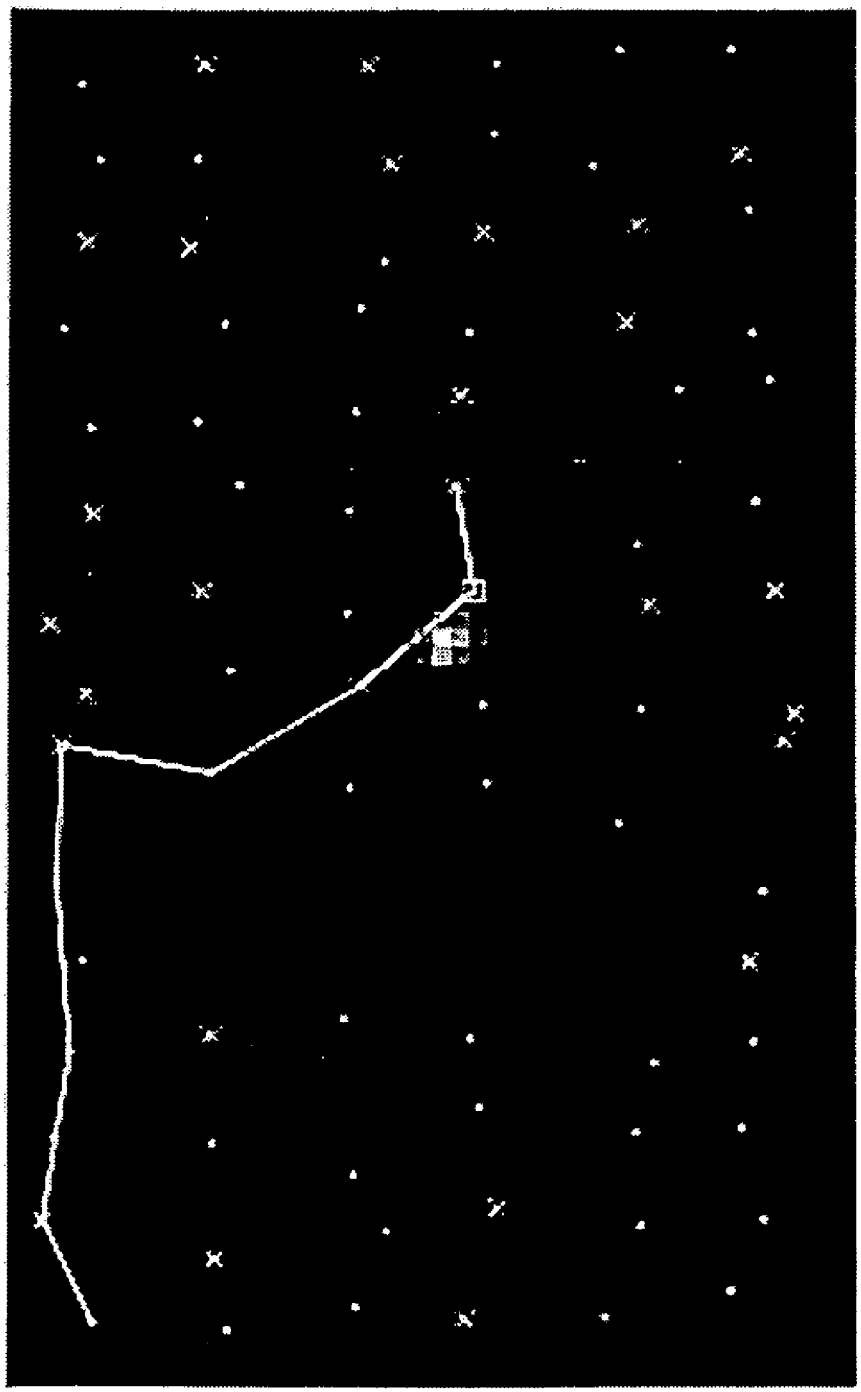
FIG. 9 is a pictorial representation of a simulated sensor layout having a query routing path produced by a min-hop algorithm.

FIG. 8 shows a query routing path produced by the greedy CADR algorithm. FIG. 9 shows a query routing path produced by the min-hop algorithm with M=3. The target is located at (125, 200), which is roughly in the middle of the sensor field. Both FIGS. 8 and 9 show the target and the selected paths, and the nodes where the path ends. Referring to FIG. 8, it is noted that the path got stuck and spent most of its hops, 17 hops out of 20, bouncing between two nodes on the lower side of the sensor hole. The ending point was far away from the target. For comparison, the min-hop path plotted in FIG. 9 is shown to have managed to get around the sensor hole and stops at a node slightly above the true target location. The tracking performance is also improved relative to that shown in FIG. 8. In other words, the target location estimate for the min-hop algorithm is more accurate and has a higher confidence than the target location estimate based on the greedy CADR algorithm.

In tracking applications, the target is often not stationary. Accordingly, the simulations deal with a moving target. A moving target may be considered as an extension of the stationary target case, and the target may be considered as approximately stationary within a short time interval. With a moving target, routing a query towards the high information content region is essentially achieved by routing a path to follow the target. In the simulation, a target is assumed to be moving along the straight line X=125 (that is the centerline of the sensor field along the vertical dimension) with a speed of 7 meters per second. The query entered at the node closest to the initial target position (125, 0). Applicants compare the min-hop algorithm (M=2, 3 and 4) with the greedy CADR, with 100 independent runs for each algorithm. The performance is summarized in Table 3. As in the stationary case, routing algorithms may get stuck at sensor holes. While a routing is stuck, the target estimate typically is expected to keep worsening due to weaker signals. In our simulation, a track was considered lost if, by the time the vehicle reached the upper side of the sensor field (Y=375), the estimate of target location of the last five steps was on average more than 60 meters away from the true target location.

We report the number of "lost" runs, and the statistics (MSE and belief size) for the good runs, averaged over all 100 runs and all time steps. We observed similar characteristics as in the stationary case. With the greedy algorithm, most of the runs lost the target, that is 93 out of 100 runs lost the target. With increasing look ahead horizon M, the percentage of lost runs was reduced significant. Among the good runs, the tracking performance improved as M increases. For example, with M=3, the square root of the MSE was only one-half of that obtained by the greedy algorithm. From these results, we can conclude that the min-hop algorithm with a modest look ahead horizon (M=2 or 3) is much more robust than the greedy CADR algorithm in the presence of sensor holes.

Figure 10:
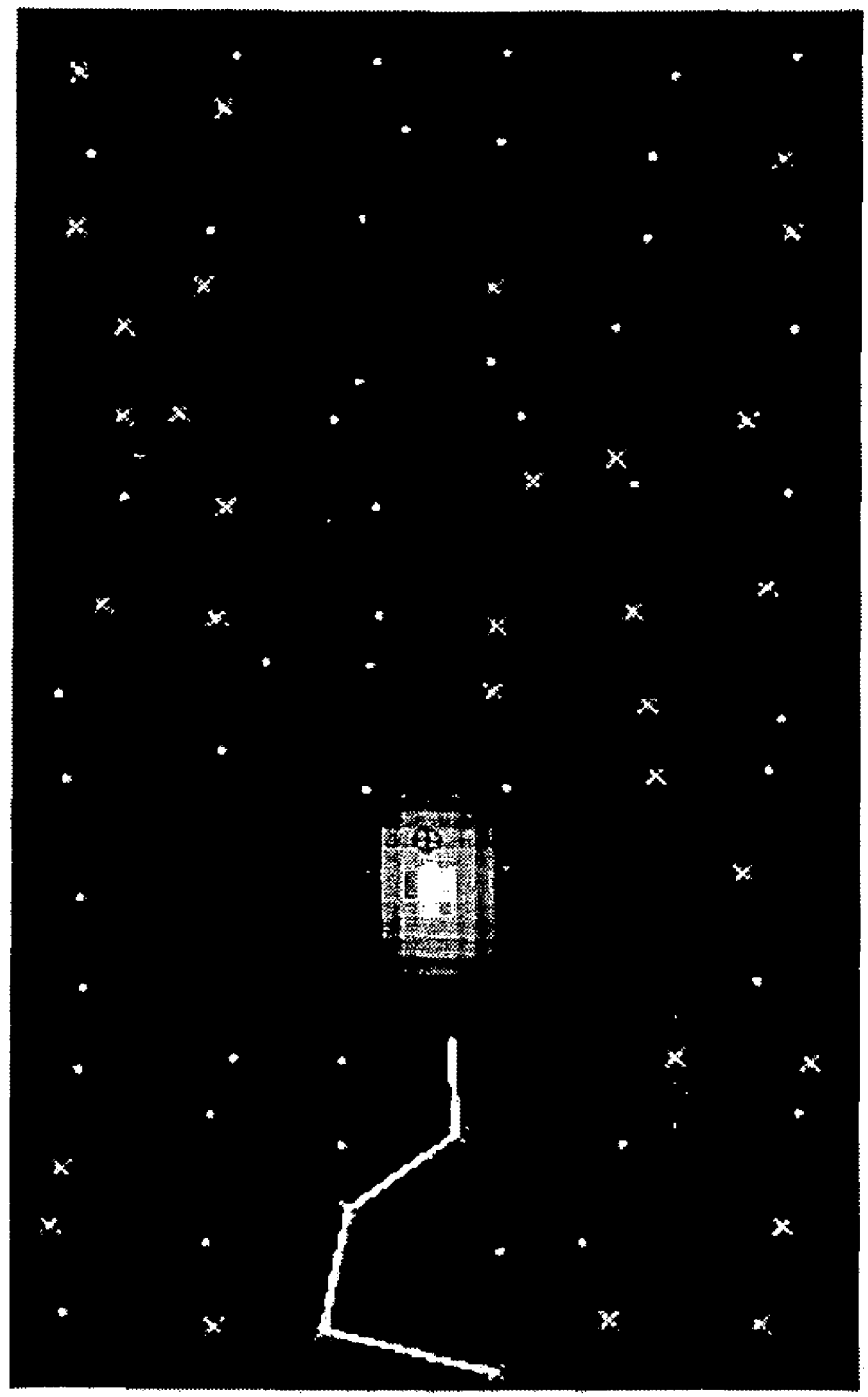
FIGS. 10 through 12 are pictorial representations of a routing query path toward a moving target produced by a min-hop algorithm at the end of 30, 60 and 90 hops, respectively.
Figure 11:
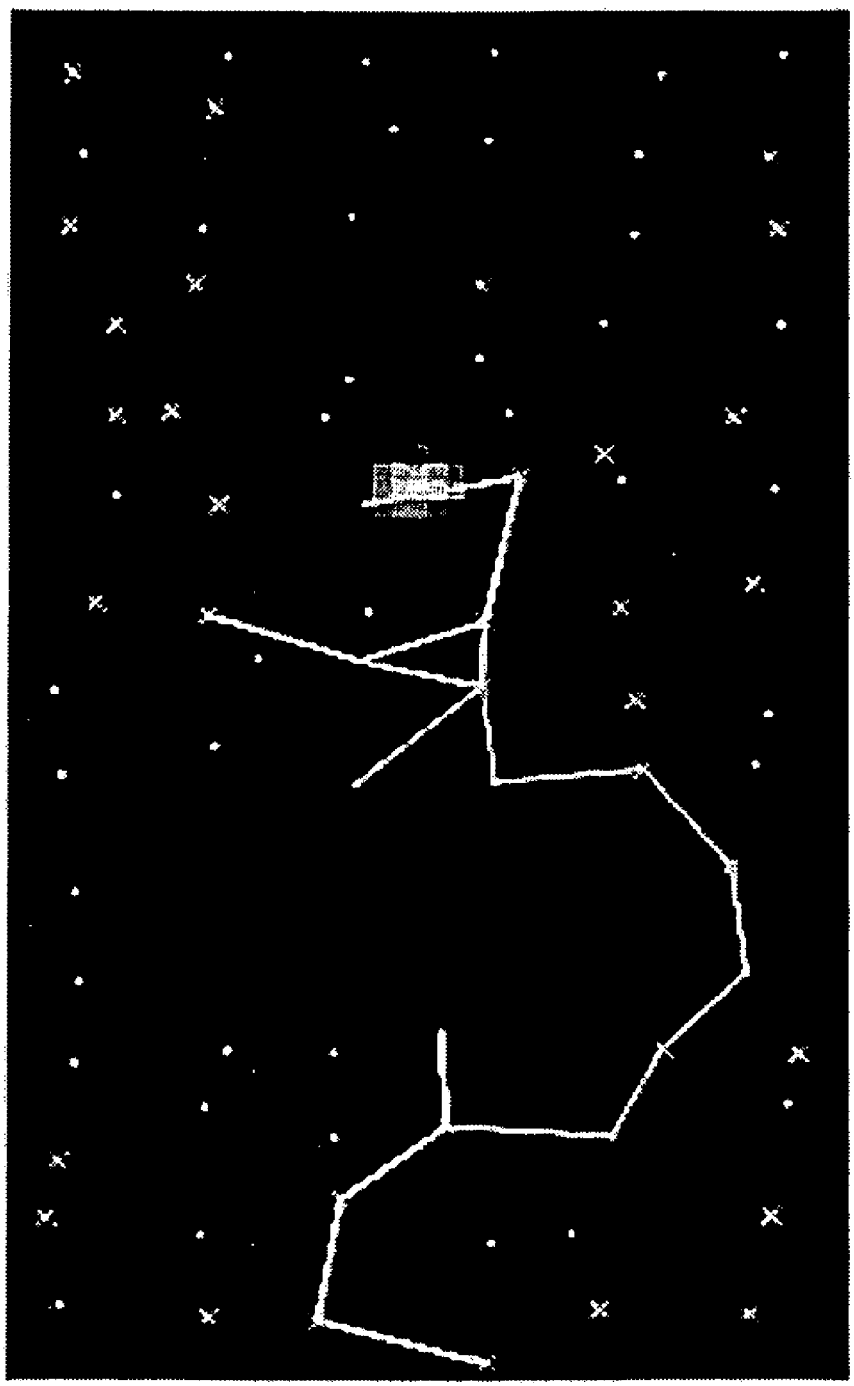
Figure 12:
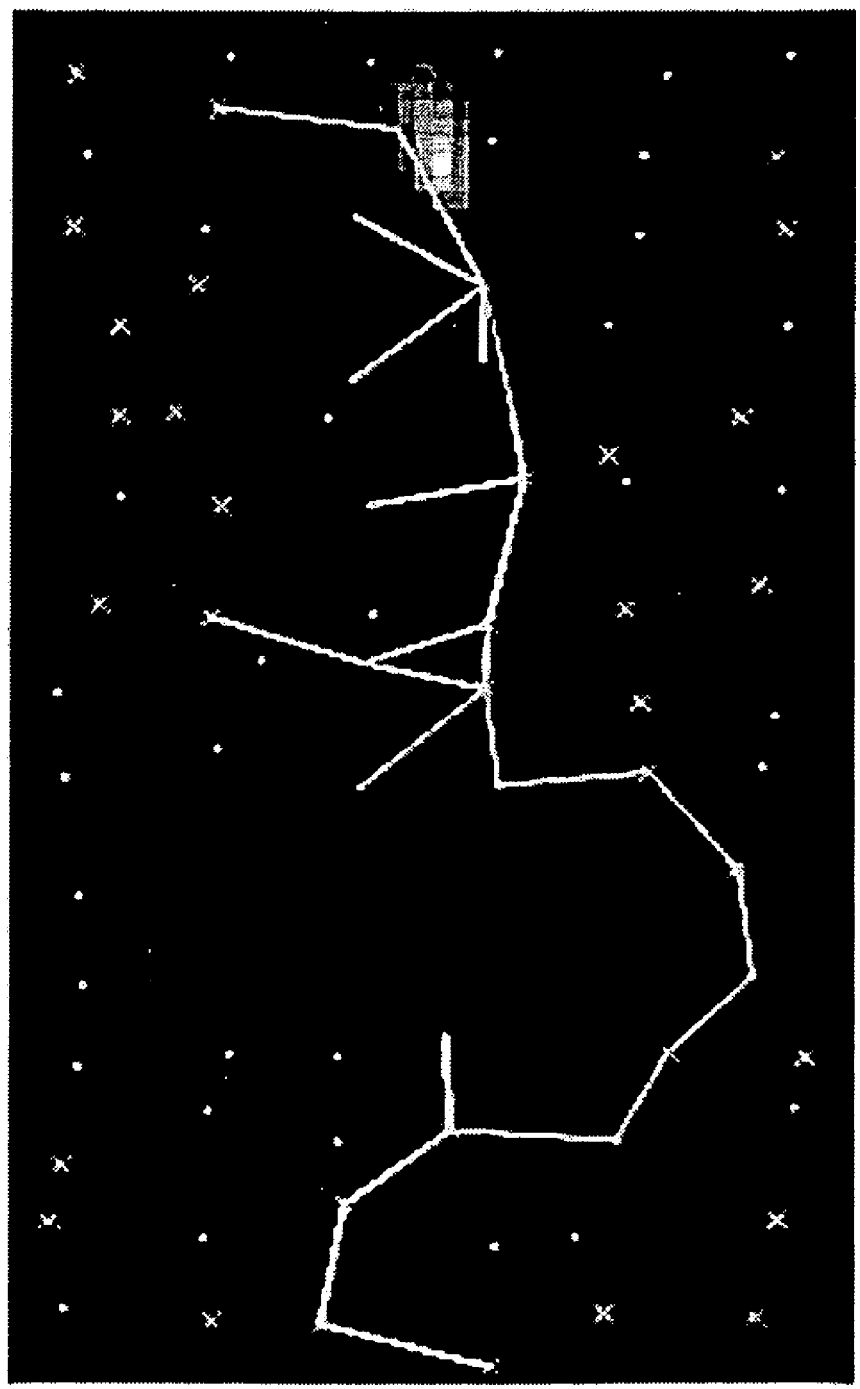
Figure 13:
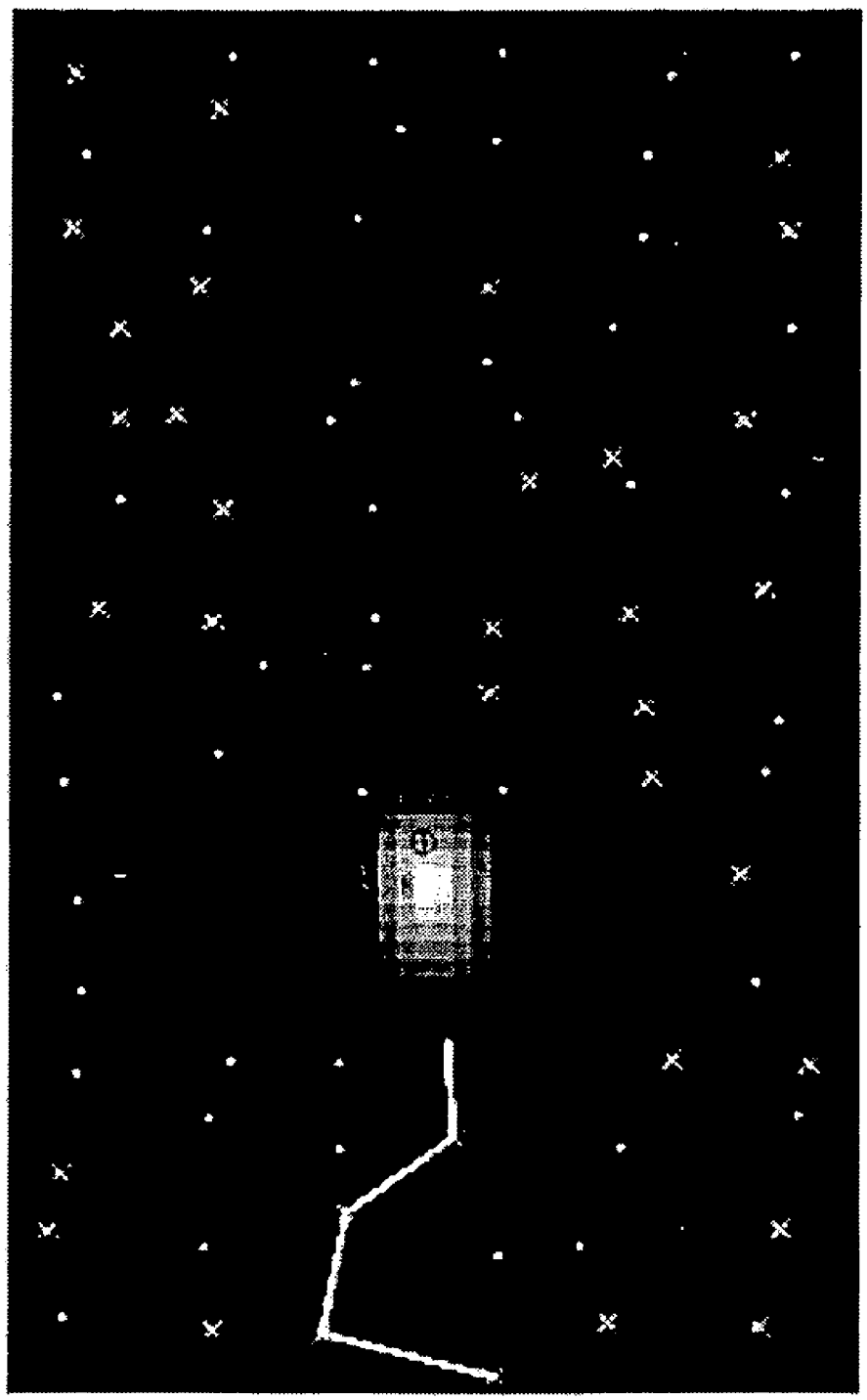
FIG. 13 through 15 are pictorial representations of a routing query path toward a moving target produced by a greedy algorithm.
Figure 14:
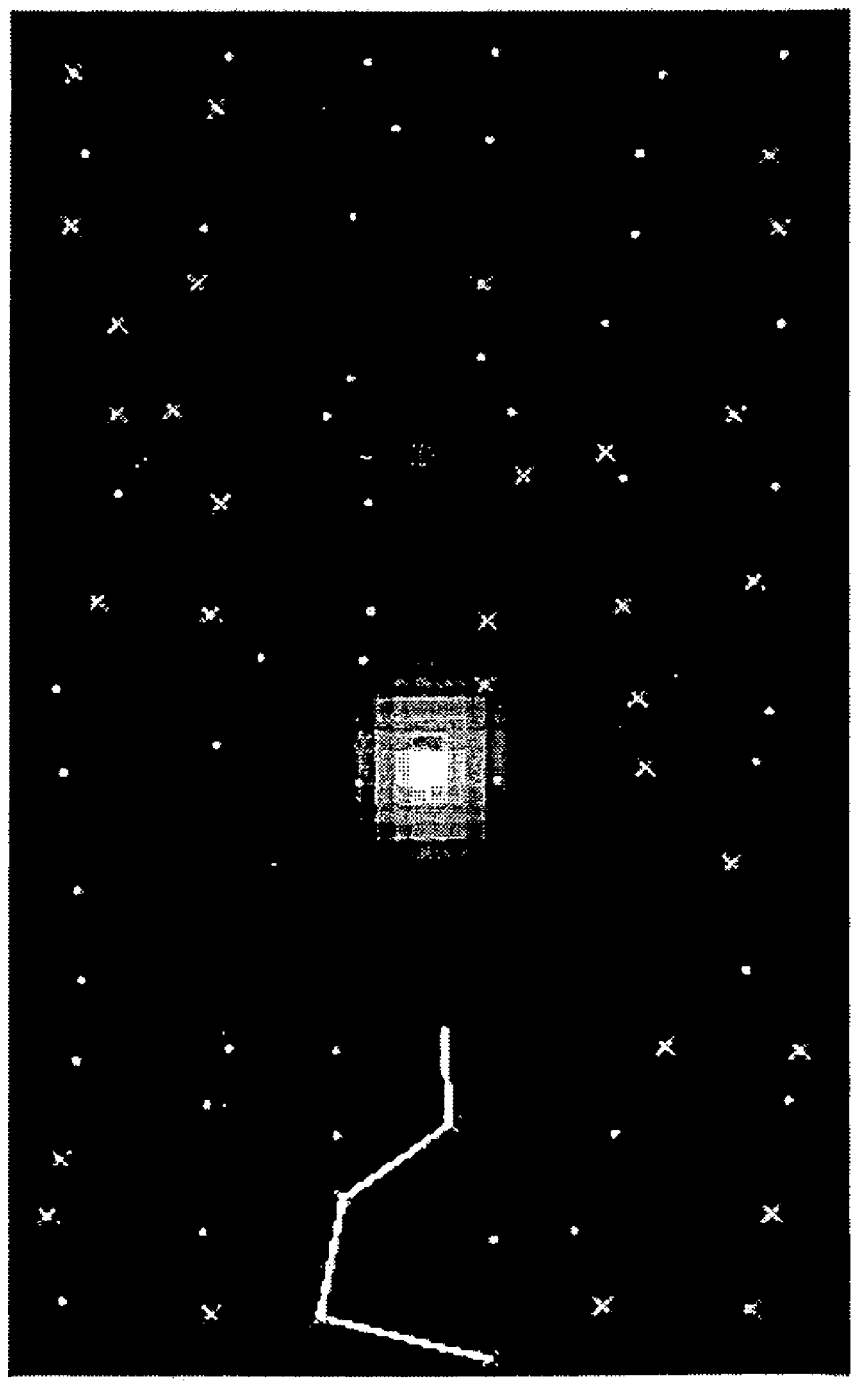
Figure 15:
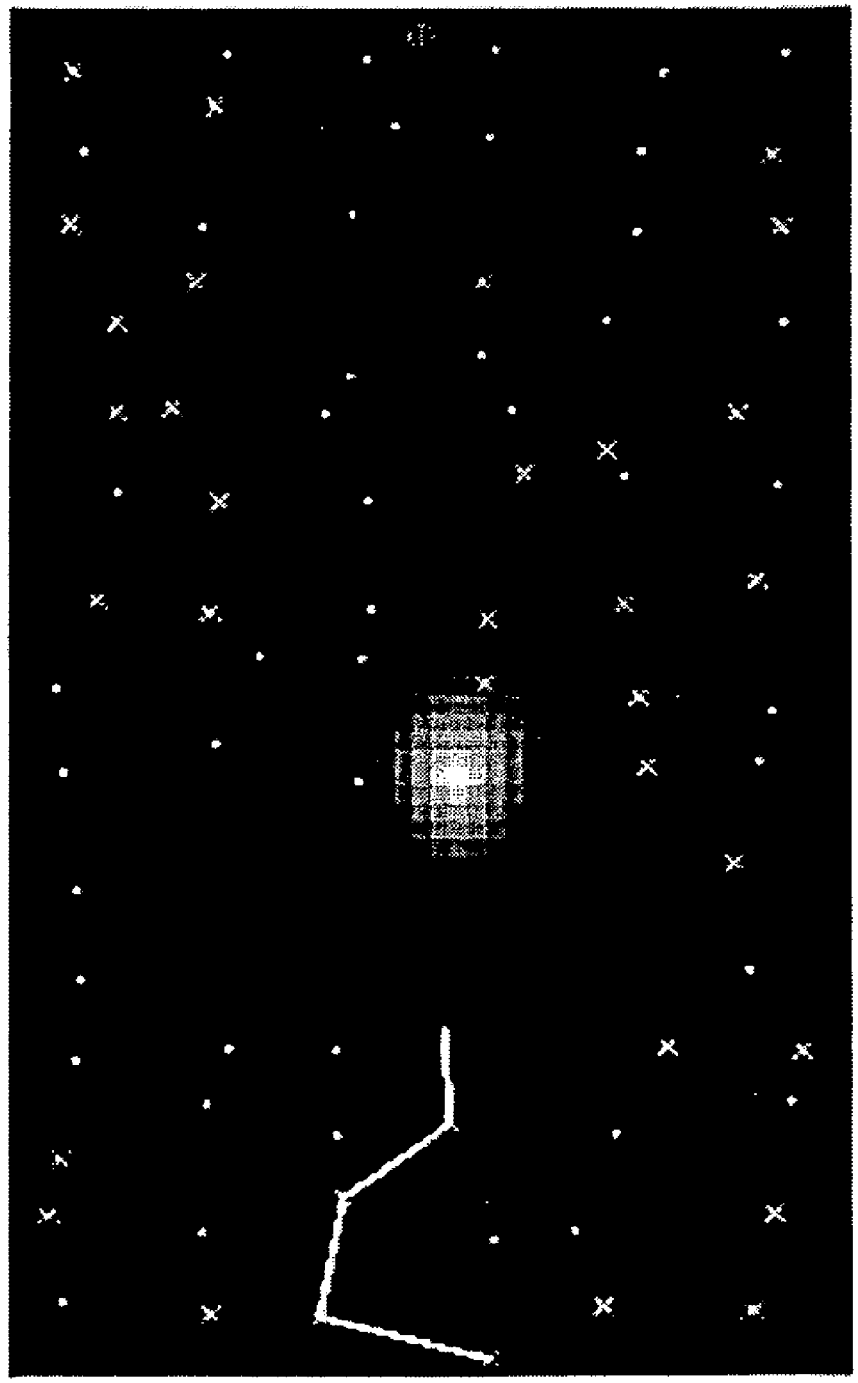

FIGS. 10, 11 and 12 show several snapshots of the routing path using the greedy algorithm. In all runs, the final path was 100-hop long. FIGS. 10, 11 and 12 show the progressive path development after 30, 60 and 90 hops. As in the stationary target situation, the min-hop algorithm routed around sensor holes. The snapshots indicate that the path mainly followed target movement, but occasionally reached out to nearby sensors to aggregate information. The belief states, i.e., states of belief about target location, appear to have followed the target fairly closely. For comparison, the path produced by the greedy CADR is plotted in FIGS. 13, 14 and 15. As shown in FIGS. 13, 14 and 15, the path produced by the greedy CADR algorithm failed to get around the sensor hole within 30 hops and was stuck ever since. The belief state failed to track the target. As the target moved away, the signal apparently became too weak to correct a belief. Accordingly, the belief about target location eventually missed the target completely. This failure appears to have been caused by the feedback between belief estimation and query routing. In other words, as the routing failed to aggregate information, the estimate appears to have become poor. Also, as the estimation accuracy deteriorated, the estimated belief state about target location appears to have provided little guidance to routing.

Applicants tested the query routing using a forward search algorithm from the query proxy to the exit node using a stationary target at (125, 200). It is noted that the selection of the query proxy and the exit node may be arbitrary. Applicants selected the query proxy node as the node closest to the lower left corner (0, 0), and the exit node was selected as the node closest to the upper left corner (0, 375). Forward search was performed on a homogeneous sensor network, as in FIG. 6, to route the query between those two nodes.

As pointed out above, the information-directed routing problem is essentially a trade off between the communication expense and information aggregation, with the balance controlled by the hypothetical path link constraint $C_0$. The simulation varied the allowance $C_0$. For each value $C_0$, 100 independent runs were simulated. The numerical results are listed in Table 4. The simulations used the shortest path as a benchmark for comparison. In this regard, reference is made to the left most point in FIG. 6. The average number of hops is seen to increase with the hypothetical allowance $C_0$. The average number of hops is the same order as $C_0$ divided by the radio range of 50 meters, but about from 35-50 percent larger. This margin accounts for the fact that sensors are not dense enough, in many instances, and communication over maximum radio range may not always be feasible. From Table 4, one can see that both the MSE and the belief size decreases with path length. Compared to the shortest path, the information-directed routes took a little bit of a detour, but improved the tracking performance considerably. On the average, the square root of MSE was cut in half.

Figure 16:
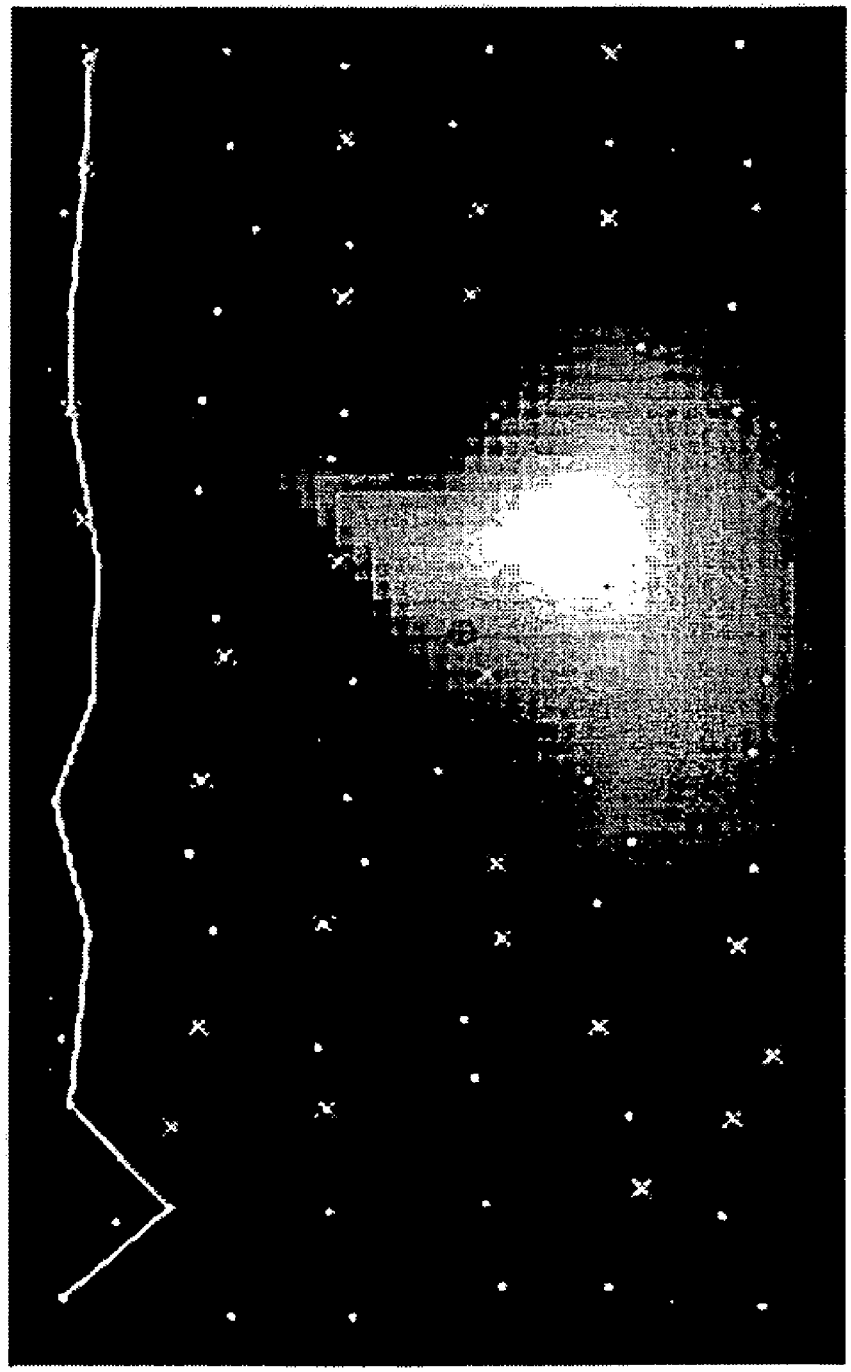
FIGS. 16 through 18 are pictorial representations of a routing query path from a proxy to an exit node.
Figure 17:
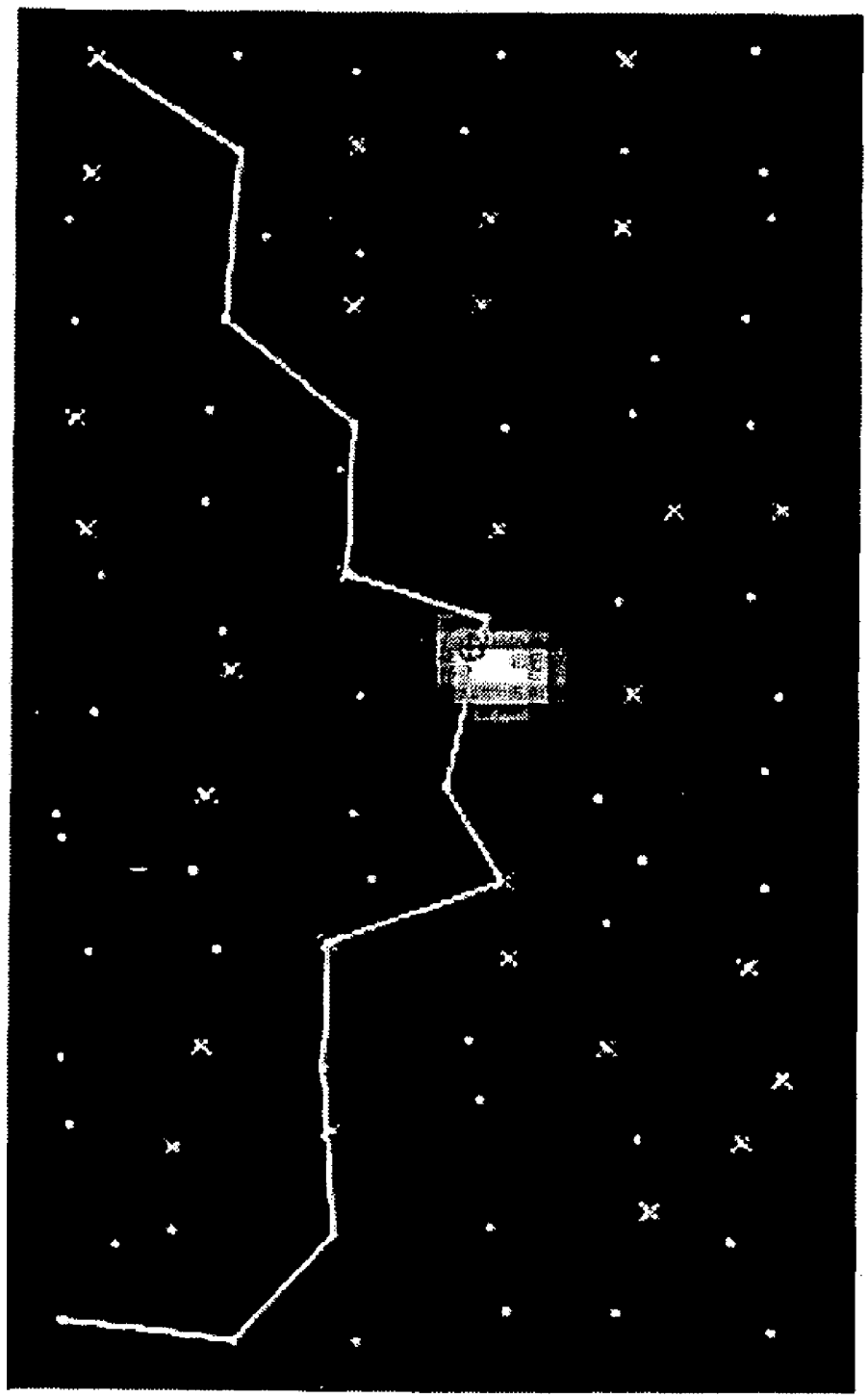
Figure 18:
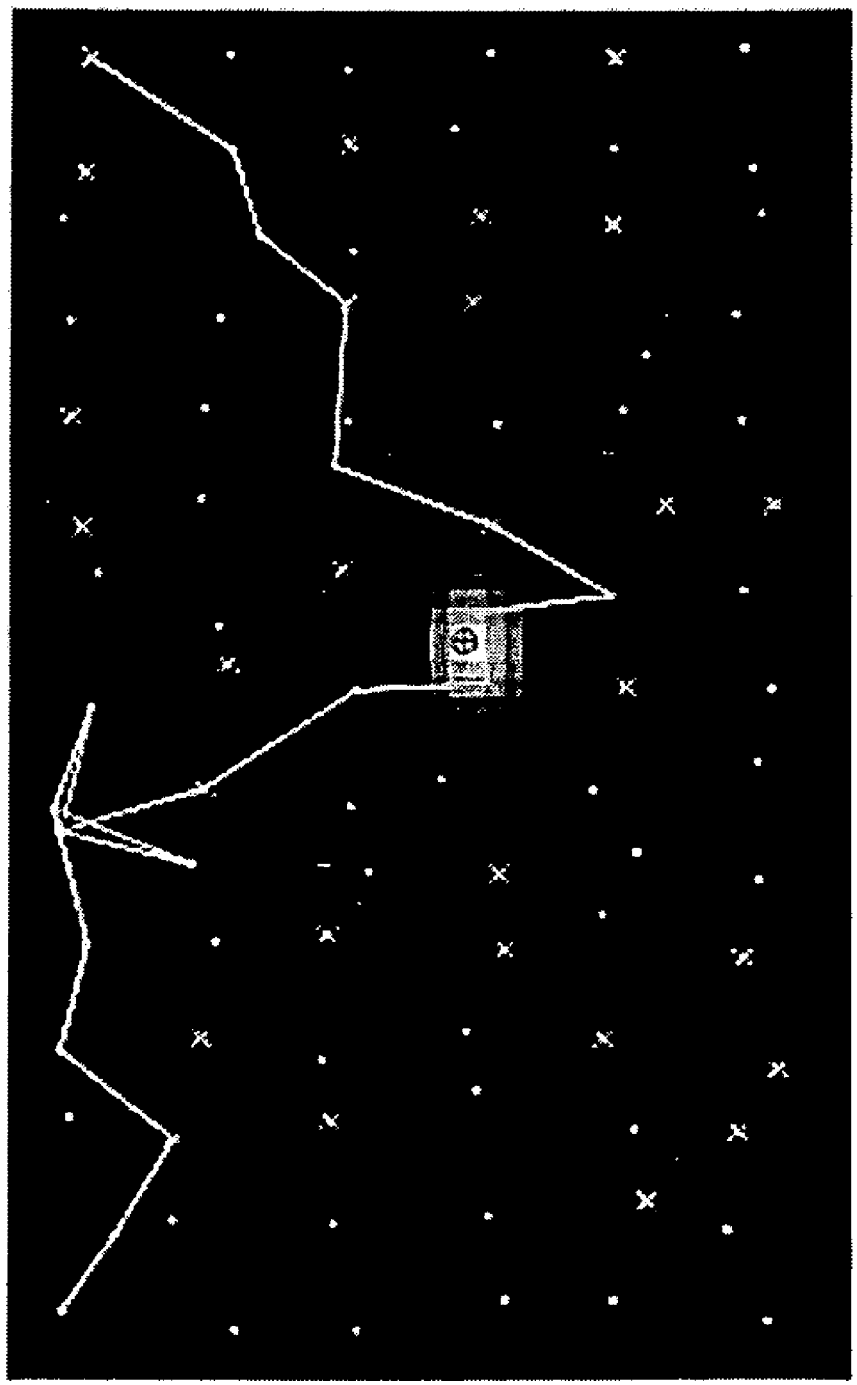

FIGS. 16, 17 and 18 show selected paths with different lengths. The shortest path is shown in FIG. 16 and has 10 hops and mostly follows a vertical line from the query proxy to the exit node. The belief state is fairly large, and cannot localize the target. FIG. 17 shows a longer path of 12 hops. Starting from the proxy the path bends towards the target direction in an attempt to accumulate information. The tracking performance is vastly better for the longer than the shorter path. FIG. 18 shows a path of 21 hops. The tracking accuracy for this third path is further improved, but the improvement is less prominent. With respect to FIG. 16, that shows the shortest path of 10 hops, the square root of MSE is 43.18 and the belief size is 1176. With respect to FIG. 17, that is the 12 hop path selected by the RTA* algorithm, the square root of (MSE) equals 3.70, and the belief size is 91. With respect to FIG. 18, that is the 21 hop path selected by the RTA* algorithm, the square root of MSE is 2.46, and the belief size is 105.

In the simulations disclosed above, the min-hop algorithm is shown when compared to the previous greedy algorithm, to be from four to 11 times more likely to succeed in routing a message around sensor holes with a three step look ahead, and at the same time produce two to four times less error in tracking a signal source.

While the invention has been described in conjunction with the exemplary embodiments outlined above, it is evident that many alternatives, modifications, and variations will be apparent to those skilled in the art. Accordingly, the exemplary embodiments of the invention, is set forth above are intended to be illustrative and not limiting. Various changes may be made without departing from the spirit and scope of the invention.

TABLE 1 function to estimate information-to-go
Input: $v_t$: current active sensor doing path planning
  P(t): path planned up to time t
  $C_o$: prespecified path length constraint
  $v_{exit}$: exit node
output:  $h_{info}$
1. compute constraint on remaining path: $C=C_o-C_{P(t)}$
2. If $C < |v_t - v_{exit}|$
    $h_{info} = 0$;
  else
    compute ellipse $E_t$: + $||-v_t|^+ + ||-v_{exit}|=C\}$
    compute extreme points $X_1, X_2, Y_1,$ and $Y_2$
    define sample paths:
      Path1=$v_t \to X_1 \to v_{exit}$. Path2 = $v_t \to X_2 \to v_{exit}$.
      Path3=$v_t \to Y_1 \to v_{exit}$. Path4 = $v_t \to Y_2 \to v_{exit}$.
    compute $h_{path}$ for path $\in$ {Path1,Path2, Path3, Path4}
    $h_{info}$ = max$h_{path}$;
  end
3. Return $h_{info}$

TABLE 2

|  | sqrt(MSE) | BELIEF SIZE | # OF STUCK-RUNS | DIST |
|---|---|---|---|---|
| CADR | 29.88 | 197.90 | 80 | 108.91 |
| M = 2 | 17.72 | 152.38 | 55 | 78.39 |
| M = 3 | 7.41 | 72.27 | 8 | 32.94 |
| M = 4 | 5.40 | 67.38 | 0 | 26.35 |

TABLE 3

|  | # OF LOST RUNS | STATISTICS OF GOOD RUNS | |
|---|---|---|---|
|  |  | sqrt(MSE) | belief size |
| CADR | 93 | 23.61 | 155.92 |
| M = 2 | 57 | 14.91 | 118.72 |
| M = 3 | 19 | 11.95 | 146.01 |
| M = 4 | 5 | 11.82 | 103.05 |

TABLE 4

| $C_o$ | sqrt(MSE) | belief size | # of hops |
|---|---|---|---|
| shortest path | 26.71 | 883.88 | 9.91 |
| 350 | 22.54 | 664.21 | 10.48 |
| 450 | 14.29 | 270.72 | 13.07 |
| 550 | 10.18 | 175.57 | 15.70 |
| 650 | 8.49 | 152.20 | 18.44 |

What is claimed is:

1. A method of routing at least one information query from one or more sensor network entry points in a network of sensor nodes to one or more destination nodes in a vicinity of physical phenomena of interest in the network, the method comprising:
   selecting a destination node by computing a utility of a plurality of network sensor nodes and selecting a node with highest utility to be the destination node wherein the computed utility indicates information gain;
   establishing a leader node;
   using a multiple step lookup procedure to determine a path between the leader node and the destination node that is optimum with respect to utility; and
   routing at least one information query to the destination node based on the path,
   a locus of all possible paths from a current node in the path to the destination node that can be traversed within a specified path length forms an ellipse with the destination node as one focus point and the current node as another focus point, the ellipse is sampled with four candidate points,
   a maximum utility among four paths corresponding to the four candidate points, is assigned as the utility of the ellipse; and the four paths start at the current node, end at the destination node, and traverse one of the ellipse's minor axis or major axis.

2. A method of routing an information query of claim 1, wherein the multiple step lookup procedure comprises: determining a minimum number of hops required to reach the destination node from the leader node;
   determining all possible paths of the minimum number of hops or less from the leader node to the destination node;
   determining the utilities of all possible minimum number of hops paths;
   selecting a minimum number of hops path that traverses nodes the sum of whose utilities is the greatest; and
   selecting a first node in the selected minimum number of hops path and passing leadership from the leader node to the first node, wherein the first node becomes the leader node.

3. A system to route information via a network of sensor nodes from a leader node to a destination node, the system comprising:
   a destination node selection mechanism that determines a utility of a plurality of nodes and selects a node with a highest utility to be the destination node; wherein the determined utility indicates information gain;
   establishing a leader node;
   a processing mechanism that determines a minimum number of hops required to reach the destination node from a current leader node;
   a processing mechanism that determines a number of possible paths within a specified number of hops or less from the current leader node to the destination node;
   a path selection mechanism that selects a minimum hop path that traverses nodes the sum of whose utilities is the greatest; and
   a selection mechanism that selects a first node in the selected minimum hop path and passes leadership from the current leader node to the first node, wherein the first node becomes the current leader node
   a locus of all possible paths from a current node in the path to the destination node that can be traversed within a specified path length forms an ellipse with the destination node as one focus point and the current node as another focus point, the ellipse is sampled with four candidate points,
   a maximum utility among four paths corresponding to the four candidate points, is assigned as the utility of the ellipse; and the four paths start at the current node, end at the destination node, and traverse one of the ellipse's minor axis or major axis.

4. The system of claim 3, further comprising: a leadership transfer mechanism that changes leadership from one node to another node.

5. A point-to-point routing method for routing a query via a network of sensor nodes including a source sensor node and a destination sensor node, the method comprising:
   selecting a source sensor node and a destination sensor node;

establishing a neighborhood around the source sensor node;

determining costs associated with communication that has already occurred along paths to sensor nodes in the neighborhood around the source sensor node and costs associated with going forward along paths to sensor nodes in the neighborhood around the source sensor node;

determining information gain based on network sensor nodes already visited for a number of paths in the neighborhood around the source sensor node and to be visited for a number of paths in the neighborhood around the source sensor node; and conducting an RTA* type forward search to relay a query from the source sensor node to the destination sensor node based on the determined cost and the determined information gain, a locus of all possible paths from a current node in the path to the destination sensor node that can be traversed within a specified path length forms an ellipse with the destination sensor node as one focus point and the current node as an other focus point, the ellipse is sampled with four candidate points, a maximum utility among four paths corresponding to the four candidate points, is assigned as the utility of the ellipse; and the four paths start at the current node, end at the destination sensor node, and traverse one of the ellipse's minor axis or major axis.

6. A method of routing information about the location of an event via a network of sensor nodes including a leader node and a destination node, the method comprising:

selecting a destination node by computing a utility of a plurality of nodes and selecting a node with a highest utility to be the destination node; wherein the utility indicates information gain establishing a leader node;

determining a minimum number of hops required to reach the destination node from the leader node;

determining all possible paths within a specified number of hops or less from the leader node to the destination node;

selecting a path within a specified number of hops or less from the leader node to the destination node that traverses nodes the sum of whose utilities is the greatest;

selecting a first node in the selected path and passing leadership from the leader node to the first node, wherein the first node becomes the leader node a locus of all possible paths from a current node in the path to the destination node that can be traversed within a specified path length forms an ellipse with the destination node as one focus point and the current node as an other focus point, the ellipse is sampled with four candidate points, a maximum utility among four paths corresponding to the four candidate points, is assigned as the utility of the ellipse; and the four paths start at the current node, end at the destination node, and traverse one of the ellipse's minor axis or major axis.

7. A method of routing a query about a location of an event of interest via a network of sensor nodes, the method comprising:

determining a source sensor node;

establishing a neighborhood around the source sensor node;

determining communication costs, including costs associated with communication that has already occurred along paths to sensor nodes in the neighborhood around the source sensor node and costs associated with going forward along paths to sensor nodes in the neighborhood around the source sensor node;

determining information gain based already visited for a number of paths to sensor nodes in the neighborhood around the source sensor node and to be visited for a number of paths to sensor nodes in the neighborhood around the source sensor node;

forming a belief state about the location of the event of interest based on the determined communication costs and determined information gain;

determining a destination based on the location of an event of interest routing the query based on the belief state, wherein a locus of all possible paths from a current node in the path to the destination that can be traversed within a specified path length forms an ellipse with the destination node as one focus point and the current node as an other focus point, the ellipse is sampled with four candidate points, a maximum utility among four paths corresponding to the four candidate points, is assigned as the utility of the ellipse; and the four paths start at the current node, end at the destination, and traverse one of the ellipse's minor axis or major axis.

8. The system of claim 3, wherein the sensor nodes comprise different types of sensors.

9. The system of claim 3, wherein the sensor nodes comprise acoustic sensors.

10. The system of claim 3, wherein the sensor nodes comprise seismic sensors.

11. A method of information-directed query routing along a path from a source node to a destination node in a network of sensor nodes, the method comprising:

selecting a source sensor node and a destination sensor node;

determining a path from the source node to the destination node that is more efficient in terms of communication cost than other paths from the source node to the destination node; and maximally aggregating gain of information about an event along the path; and routing a query based on the determined cost and aggregated information gain, wherein a locus of all possible paths from a current node in the path to the destination node that can be traversed within a specified path length forms an ellipse with the destination node as one focus point and the current node as an other focus point, the ellipse is sampled with four candidate points, a maximum utility among four paths corresponding to the four candidate points, is assigned as the utility of the ellipse; and the four paths start at the current node, end at the destination node, and traverse one of the ellipse's minor axis or major axis.

12. A method of point-to-point routing of query information regarding a phenomenon of interest in a sensor network having a plurality of sensor nodes along a path from an entry point node to an exit point, the method comprising:

establishing a leader node;

maximally aggregating information about a phenomenon of interest along a path from an entry point node to an exit point by estimating information expected to be gained from the entry node to the exit point node;

selecting a successor leader node based on the estimated information expected to be gained;

routing query information based on the maximally aggregated information, wherein a locus of all possible paths from a current node in the path to the exit point that can be traversed within a specified path length forms an ellipse with the exit point as one focus point and the current node as an other focus point, the ellipse is sampled with four candidate points, a maximum utility among four paths corresponding to the four candidate points, is assigned as the utility of the ellipse; and the four paths start at the current node, end at the exit point, and traverse one of the ellipse's minor axis or major axis.

13. The method of claim 12, wherein estimating the information expected comprises establishing and moving a frontier and iteratively expanding nodes on the frontier until the exit point is reached.

14. The method of claim 12, further comprising: obtaining network node sensor measurements to refine target estimates of the exit point wherein the exit point is the location of an event of interest.

15. The method of claim 11, wherein maximally aggregating gain of information about the event of interest along the path comprises finding a path that includes detours around sensor network holes and at least one path ending.

* * * * *